US009086020B2

(12) United States Patent
Pirjaberi et al.

(10) Patent No.: US 9,086,020 B2
(45) Date of Patent: Jul. 21, 2015

(54) FIRING FRACTION MANAGEMENT IN SKIP FIRE ENGINE CONTROL

(71) Applicant: Tula Technology, Inc., Santa Clara, CA (US)

(72) Inventors: Mohammad R. Pirjaberi, San Jose, CA (US); Adya S. Tripathi, San Jose, CA (US); Louis J. Serrano, Los Gatos, CA (US)

(73) Assignee: Tula Technology, Inc., San Jose, CA (US)

( * ) Notice: Subject to any disclaimer, the term of this patent is extended or adjusted under 35 U.S.C. 154(b) by 538 days.

(21) Appl. No.: 13/654,244

(22) Filed: Oct. 17, 2012

(65) Prior Publication Data

US 2013/0092127 A1 Apr. 18, 2013

Related U.S. Application Data

(60) Provisional application No. 61/548,187, filed on Oct. 17, 2011, provisional application No. 61/640,646, filed on Apr. 30, 2012.

(51) Int. Cl.

| | |
|---|---|
| ***F02D 17/02*** | (2006.01) |
| ***F02D 41/00*** | (2006.01) |
| *F02D 13/06* | (2006.01) |
| *F02P 5/15* | (2006.01) |
| *G06F 17/00* | (2006.01) |
| *F02D 37/02* | (2006.01) |
| *F02D 41/28* | (2006.01) |

(52) U.S. Cl.

CPC ............ *F02D 17/02* (2013.01); *F02D 41/0087* (2013.01); *F02D 37/02* (2013.01); *F02D 2041/286* (2013.01); *F02D 2200/101* (2013.01)

(58) Field of Classification Search

CPC . F02D 17/02; F02D 13/06; F02D 2200/1015; F02D 2250/18; F02D 2250/21; F02D 41/0087; F02D 37/02; F02D 2041/286; F02D 2200/101; G06F 17/00; G06F 19/00; F02P 5/15; Y02T 10/6226; Y02T 10/6286

See application file for complete search history.

(56) References Cited

U.S. PATENT DOCUMENTS

| | | | |
|---|---|---|---|
| 3,756,205 | A | 9/1973 | Frost |
| 4,172,434 | A | 10/1979 | Coles |
| 4,274,382 | A | 6/1981 | Sugasawa et al. |
| 4,276,863 | A | 7/1981 | Sugasawa et al. |
| 4,434,767 | A | 3/1984 | Kohama et al. |
| 4,489,695 | A | 12/1984 | Kohama et al. |
| 4,509,488 | A | 4/1985 | Forster et al. |

(Continued)

OTHER PUBLICATIONS

International Search Report mailed Mar. 27, 2013 in PCT Application No. PCT/US2012/060641.

(Continued)

*Primary Examiner* — Hieu T Vo

(74) *Attorney, Agent, or Firm* — Beyer Law Group LLP

(57) ABSTRACT

In various described embodiments skip fire control is used to deliver a desired engine output. A controller determines a skip fire firing fraction and (as appropriate) associated engine settings that are suitable for delivering a requested output. In one aspect, the firing fraction is selected from a set of available firing fractions, with the set of available firing fractions varying as a function of engine speed such that more firing fractions are available at higher engine speeds than at lower engine speeds. The controller then direct firings in a skip fire manner that delivers the selected fraction of firings.

37 Claims, 6 Drawing Sheets

(56) References Cited

U.S. PATENT DOCUMENTS

| | | | |
|---|---|---|---|
| 4,541,387 | A | 9/1985 | Morikawa |
| 5,117,790 | A | 6/1992 | Clarke et al. |
| 5,374,224 | A | 12/1994 | Huffmaster et al. |
| 5,377,631 | A | 1/1995 | Schechter |
| 5,408,966 | A | 4/1995 | Lipinski et al. |
| 5,408,974 | A | 4/1995 | Lipinski et al. |
| 5,540,633 | A | 7/1996 | Yamanaka et al. |
| 5,553,575 | A | 9/1996 | Beck et al. |
| 5,584,266 | A | 12/1996 | Motose et al. |
| 5,692,471 | A | 12/1997 | Zhang |
| 5,720,257 | A | 2/1998 | Motose et al. |
| 5,778,858 | A | 7/1998 | Garabedian |
| 5,975,052 | A | 11/1999 | Moyer |
| 6,138,636 | A | 10/2000 | Kohno et al. |
| 6,158,411 | A | 12/2000 | Morikawa |
| 6,247,449 | B1 | 6/2001 | Persson |
| 6,360,724 | B1 | 3/2002 | Suhre et al. |
| 6,408,625 | B1 | 6/2002 | Woon et al. |
| 6,619,258 | B2 | 9/2003 | McKay et al. |
| 6,735,938 | B2 | 5/2004 | Surnilla |
| 6,874,462 | B2 | 4/2005 | Matthews |
| 6,978,204 | B2 | 12/2005 | Surnilla et al. |
| 7,028,670 | B2 | 4/2006 | Doering |
| 7,032,545 | B2 | 4/2006 | Lewis et al. |
| 7,032,581 | B2 | 4/2006 | Gibson et al. |
| 7,044,101 | B1 | 5/2006 | Duty et al. |
| 7,063,062 | B2 | 6/2006 | Lewis et al. |
| 7,086,386 | B2 | 8/2006 | Doering |
| 7,146,966 | B2 | 12/2006 | Nakamura |
| 7,179,199 | B2 | 2/2007 | Kushiyama et al. |
| 7,231,907 | B2 | 6/2007 | Bolander et al. |
| 7,249,583 | B2 | 7/2007 | Bidner et al. |
| 7,275,518 | B1 | 10/2007 | Gartner et al. |
| 7,275,916 | B2 | 10/2007 | Smith et al. |
| 7,278,391 | B1 | 10/2007 | Wong et al. |
| 7,288,046 | B2 | 10/2007 | Boone et al. |
| 7,350,499 | B2 | 4/2008 | Takaoka et al. |
| 7,426,915 | B2 | 9/2008 | Gibson et al. |
| 7,503,312 | B2 | 3/2009 | Surnilla et al. |
| 7,571,707 | B2 | 8/2009 | Gibson et al. |
| 7,577,511 | B1 | 8/2009 | Tripathi et al. |
| 7,751,963 | B2 | 7/2010 | Gecim et al. |
| 7,849,835 | B2 | 12/2010 | Tripathi et al. |
| 7,886,715 | B2 | 2/2011 | Tripathi et al. |
| 7,930,087 | B2 | 4/2011 | Gibson et al. |
| 7,954,474 | B2 | 6/2011 | Tripathi et al. |
| 8,099,224 | B2 | 1/2012 | Tripathi et al. |
| 8,108,132 | B2 | 1/2012 | Reinke |
| 8,131,445 | B2 | 3/2012 | Tripathi et al. |
| 8,131,447 | B2 | 3/2012 | Tripathi et al. |
| 8,145,410 | B2 | 3/2012 | Berger et al. |
| 8,336,521 | B2 | 12/2012 | Tripathi et al. |
| 8,464,690 | B2 * | 6/2013 | Yuille et al. .................... 701/22 |
| 8,473,179 | B2 | 6/2013 | Whitney et al. |
| 8,839,766 | B2 * | 9/2014 | Serrano ......................... 123/481 |
| 8,892,330 | B2 * | 11/2014 | Yuille et al. .................... 701/84 |
| 2003/0213467 | A1 | 11/2003 | Rayl et al. |
| 2004/0118116 | A1 | 6/2004 | Beck et al. |
| 2008/0154468 | A1 | 6/2008 | Berger et al. |
| 2008/0262712 | A1 | 10/2008 | Duty et al. |
| 2009/0048764 | A1 | 2/2009 | Fuwa |
| 2009/0177371 | A1 | 7/2009 | Reinke |
| 2010/0012072 | A1 | 1/2010 | Leone et al. |
| 2010/0043744 | A1 | 2/2010 | Suzuki et al. |
| 2010/0050993 | A1 | 3/2010 | Zhao et al. |
| 2010/0089362 | A1 | 4/2010 | Haskara et al. |
| 2011/0146232 | A1 | 6/2011 | Westervelt et al. |
| 2011/0251773 | A1 | 10/2011 | Sahandiesfanjani et al. |
| 2012/0055444 | A1 | 3/2012 | Tobergte et al. |
| 2012/0109495 | A1 | 5/2012 | Tripathi et al. |
| 2012/0143471 | A1 | 6/2012 | Tripathi et al. |
| 2014/0053802 | A1 | 2/2014 | Rayl |
| 2014/0053804 | A1 | 2/2014 | Rayl et al. |
| 2014/0053805 | A1 | 2/2014 | Brennan et al. |
| 2014/0069178 | A1 | 3/2014 | Beikmann |
| 2014/0069378 | A1 | 3/2014 | Burleigh et al. |
| 2014/0069379 | A1 | 3/2014 | Beikmann |
| 2014/0069381 | A1 | 3/2014 | Beikmann |
| 2014/0090623 | A1 | 4/2014 | Beikmann |
| 2014/0090624 | A1 | 4/2014 | Verner |
| 2014/0102411 | A1 | 4/2014 | Brennan |

OTHER PUBLICATIONS

Written Opinion mailed Mar. 27, 2013 in PCT Application No. PCT/US2012/060641.

Fujiwara et al., "Development of a 6-Cylinder Gasoline Engine with New Variable Cylinder Management Technology," SAE International, 2008 World Congress, Detroit, MI, Apr. 14-17, 2008.

Klauer, "Lehrstuhl für Angewandte Thermodyamik," Diploma work Rheinish-Westfälischen Technischen, Aachen, Germany, published Mar. 1983.

Bates et al., "Variable Displacement by Engine Valve Control," Society of Automotive Engineers, Inc., published 1978.

U.S. Appl. No. 13/774,134, filed Feb. 22, 2013.

International Preliminary Report on Patentability dated Feb. 17, 2014 from International Application No. PCT/US2012/060641.

* cited by examiner

FIRING FRACTION MANAGEMENT IN SKIP FIRE ENGINE CONTROL

CROSS REFERENCE TO RELATED APPLICATIONS

This application claims priority of Provisional Application Nos. 61/548,187 filed Oct. 17, 2011 and 61/640,646 filed Apr. 30, 2012, which are both incorporated herein by reference.

FIELD OF THE INVENTION

The present invention relates generally to skip fire control of internal combustion engines. More particularly firing fraction management is used to help mitigate NVH concerns in skip fire engine control.

BACKGROUND OF THE INVENTION

Most vehicles in operation today (and many other devices) are powered by internal combustion (IC) engines. Internal combustion engines typically have a plurality of cylinders or other working chambers where combustion occurs. Under normal driving conditions, the torque generated by an internal combustion engine needs to vary over a wide range in order to meet the operational demands of the driver. Over the years, a number of methods of controlling internal combustion engine torque have been proposed and utilized. Some such approaches contemplate varying the effective displacement of the engine. Engine control approaches that vary the effective displacement of an engine by sometimes skipping the firing of certain cylinders are often referred to as "skip fire" engine control. In general, skip fire engine control is understood to offer a number of potential advantages, including the potential of significantly improved fuel economy in many applications. Although the concept of skip fire engine control has been around for many years, and its benefits are understood, skip fire engine control has not yet achieved significant commercial success.

It is well understood that operating engines tend to be the source of significant noise and vibrations, which are often collectively referred to in the field as NVH (noise, vibration and harshness). In general, a stereotype associated with skip fire engine control is that skip fire operation of an engine will make the engine run significantly rougher than conventional operation. In many applications such as automotive applications, one of the most significant challenges presented by skip fire engine control is vibration control. Indeed, the inability to satisfactorily address NVH concerns is believed to be one of the primary obstacles that has prevented widespread adoption of skip fire types of engine control.

Co-assigned U.S. Pat. Nos. 7,954,474; 7,886,715; 7,849,835; 7,577,511; 8,099,224; 8,131,445 and 8,131,447 and co-assigned application Ser. Nos. 13/004,839; 13/004,844; and others, describe a variety of engine controllers that make it practical to operate a wide variety of internal combustion engines in a skip fire operational mode. Each of these patents and patent applications is incorporated herein by reference. Although the described controllers work well, there are continuing efforts to further improve the performance of these and other skip fire engine controllers to further mitigate NVH issues in engines operating under skip fire control. The present application describes additional skip fire control features and enhancements that can improve engine performance in a variety of applications.

SUMMARY

In various described embodiments, skip fire control is used to deliver the desired engine output. A controller determines a skip fire firing fraction and (as appropriate) associated engine settings that are suitable for delivering a requested output.

In one aspect, the firing fraction is selected from a set of available firing fractions, with the set of available firing fractions varying as a function of engine speed such that more firing fractions are available at higher engine speeds than at lower engine speeds. The controller then directs firings in a skip fire manner that delivers the selected fraction of firings.

In another aspect, a requested firing fraction is initially determined that is suitable for delivering the desired engine output under selected engine operating conditions (which may be optimized operating conditions or otherwise). When appropriate, an adjusted firing fraction is thereafter determined that is a more preferred operational firing fraction. The adjusted (operational/commanded) firing fraction is generally close to, but different than the requested firing fraction. The actual firings are then directed in a skip fire manner that substantially delivers the commanded adjusted firing fraction. At least one engine control parameter is adjusted appropriately such that the engine outputs the desired output at the adjusted firing fraction.

The use of such an adjusted firing fraction is particularly useful when the requested firing fraction would cause the generation of a firing sequence that includes undesirable frequency components and/or is prone to the inducement of undesirable vibrations or acoustics. In such cases, a more desirable operational firing fraction can be used and other engine control parameters (such as intake manifold pressure, valve timing, spark timing, etc.) may be used to insure the delivery of the desired engine output. In some embodiments, an adjusted firing fraction determining unit is arranged to determine an operational firing fraction that reduces vibrations within a defined frequency range relative to the requested firing fraction.

In yet another aspect, filtering may be used to spread commanded firing fraction changes over multiple firing opportunities. This is particularly useful in skip fire controllers that track the portion of a firing that has been requested but not yet directed by the firing controller and use such information to help manage transitions between different commanded firing fractions.

In another aspect, some embodiments the controller is further arranged to adjust one or more selected engine parameters (e.g., manifold pressure, valve timing, spark timing, throttle position, etc.) as part of the skip fire control. Often, the response of such adjustments is slower than changes can be made in the commanded firing fraction. In such applications the filtering may be arranged to cause the response to changes in the commanded firing fraction to correspond to the response to changes in the altered engine control parameter(s).

In various embodiments, a power train parameter adjusting block may be arranged to cause the adjustment one or more selected power train control parameter(s) in a manner that causes the engine to produce the desired output at the currently commanded firing fraction. In another aspect, a filter having a response that substantially matches the response of the adjusted power train control parameter(s) is provided. The filter is arranged to cause changes in the commanded firing fraction to correspond to changes in the adjusted power train control parameter.

In another aspect, the skip fire controller is arranged to select a base firing fraction that has a repeating firing cycle length that will repeat at least a designated number of times per second at the current engine speed. Such an arrangement can be helpful in reducing the occurrence of undesirable vibrations.

The skip fire engine controllers in accordance with any of the aforementioned aspects are preferably arranged to track the portion of a firing that has been commanded but not yet directed to thereby help manage transitions between different commanded firing fractions. The controllers are also preferably arranged to spread the firings while delivering the commanded firing fraction and through changes in the commanded firing fraction. In some implementations, such functionality is provided through the use of a first order sigma delta converter or its functional equivalent.

In some embodiments, hysteresis may be applied in the determination of the firing fraction to help reduce the probability of rapid fluctuations back and forth between selected firing fractions. The hysteresis may be applied to the requested torque, the engine speed and/or other suitable inputs.

In some embodiments, additional firings may occasionally be instructed to facilitate breaking a cyclic pattern associated with a commanded firing fraction. Additionally or alternatively, dither may be added to the commanded firing fraction to facilitate breaking a cyclic pattern associated with a repeating firing cycle.

In some embodiments, a multi-dimensional lookup table may be used to determine the operational firing fraction. In selected implementations, a first index to the lookup table is one of requested output and requested firing fraction and a second index for the lookup table is engine speed. In various embodiments, an additional or alternative index for the lookup table is transmission gear.

The various aspects and features described above may be implemented separately or in any combination.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

Figure 1:
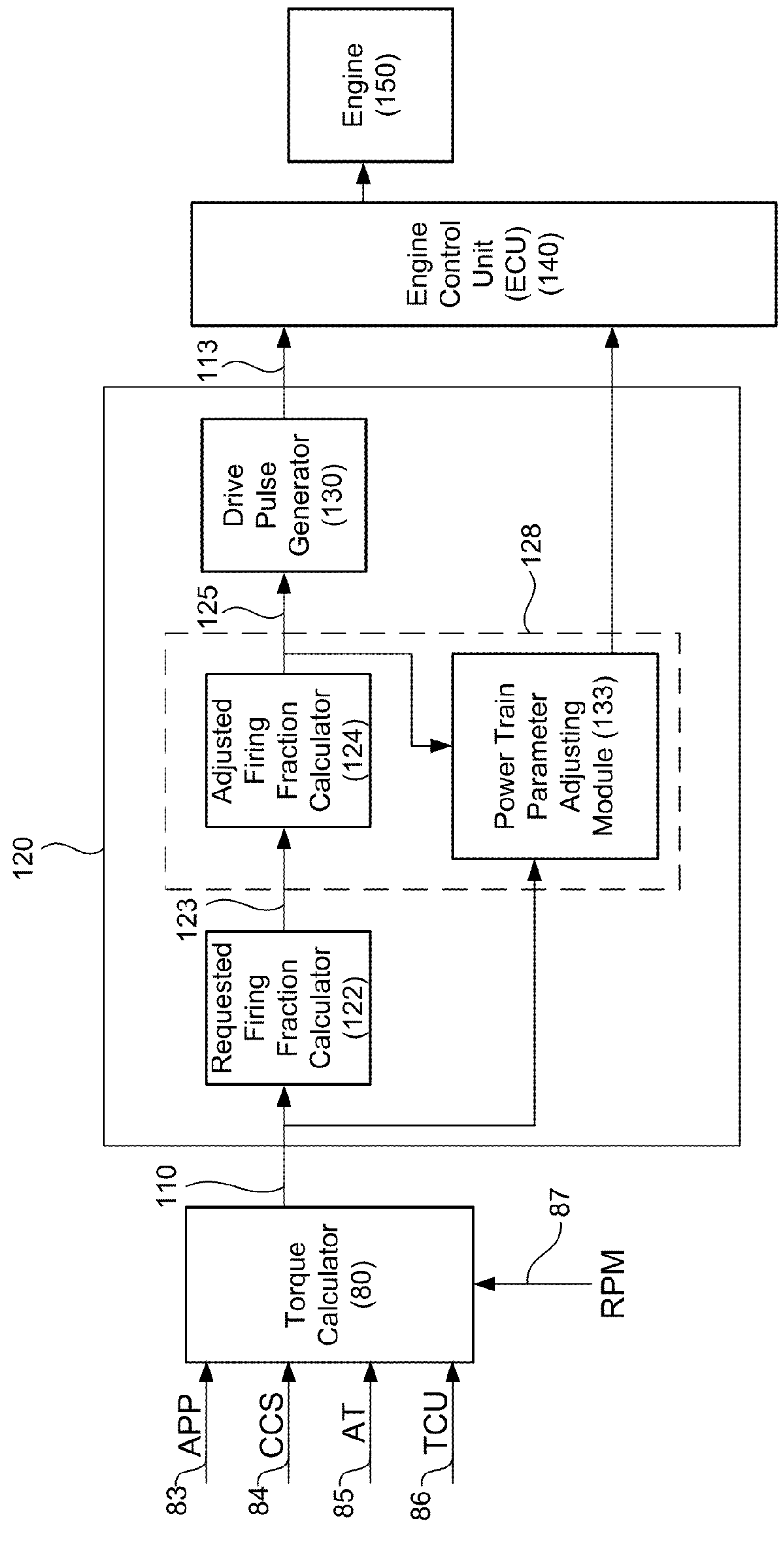
FIG. 1 is a block diagram illustrating a skip fire based engine firing control unit in accordance with one embodiment of the present invention.

Skip fire engine controllers are generally understood to be susceptible to the generation of undesirable vibrations. When a small set of fixed skip fire firing patterns are used, the available firing patterns can be chosen so as to minimize vibrations during steady state use. Thus, many skip fire engine controllers are arranged to permit the use of only a very small set of predefined firing patterns. Although such designs can be made to work, constraining the available skip fire firing patterns to a very small set of predefined sequences tends to limit the fuel efficiency gains that are made possible using skip fire control. Such designs also tend to experience engine roughness during transitions between firing fractions. More recently, the assignee of the present application has proposed a variety of skip fire engine controllers that facilitate operating an engine in a continuously variable displacement mode in which the firings are dynamically determined to meet the driver's demand. Such firing controllers, (some of which are described in the incorporated patents and patent applications) are not constrained to using a relatively small set of fixed firing patterns. Rather, in some of the described implementations, the effective displacement of the engine can be changed at any time to track the drivers demand by altering the delivered skip fire firing fraction in a manner that meets the drivers demand. Although such controllers work well, there are continuing efforts to even further improve the noise, vibration and harshness (NVH) characteristics of skip fire controller designs.

The skip fire firing control approaches described herein seek to obtain the flexibility of dynamic determination of the firing sequence, while reducing the probability that undesirable firing sequences will be generated during operation of the controlled engine. In some of the described embodiments, this is accomplished in part by avoiding or minimizing the use of firing fractions that have undesirable NVH characteristics. In one particular example, it has been observed that low frequency vibrations (for example, in the range of 0.2 to 8 Hz) are particularly objectionable to vehicle occupants and accordingly, in some embodiments efforts are made to minimize the use of firing sequences that are most likely to generate vibrations in this frequency range. At the same time, the engine is preferably controlled to consistently deliver the desired output and to smoothly handle transitions. In some other embodiments, mechanisms are provided which promote the use of firing fractions that have better NVH characteristics.

The nature of the problem can perhaps, most readily be visualized in the context of a skip fire controller that treats the signal inputted to the firing controller as a request for a designated firing fraction and utilizes a first order sigma delta converter to determine the timing of specific firings. When a first order sigma delta converter is used, then conceptually, for any given digitally implemented input signal level (e.g., for any specific requested firing fraction), an essentially fixed repeating firing pattern will be generated by the firing controller (due in part to the quantization of the input signal). In such an embodiment, a steady input would effectively cause the generation of a set firing pattern (although the phase of the firing sequence may be offset somewhat based upon the initial value in the accumulator). As is well understood by those familiar with the art, an engine will operate quite smoothly when some firing patterns are generated, whereas other firing patterns are more likely to generate undesirable vibrations. We have observed that firing sequences that have frequency components in the general range of 0.2 to 8 Hz tend to generate the most undesirable vibrations and that a noticeably smoother ride is felt by the vehicle occupants if the skip fire firing control unit is constrained to only generate firing sequences/patterns that minimize fundamental frequency components in that range.

Referring next to FIG. 1, an engine controller in accordance with one embodiment of the present invention will be described. The engine controller includes a firing control unit 120 (skip fire controller) that is arranged to try to eliminate (or at least substantially reduce) the generation of firing sequences that include fundamental frequency components in a designated frequency range. For the purpose of illustration, the frequency range of 0.2 to 8 Hz is treated as the frequency range of concern. However, it should be appreciated that the concepts described herein can more generally be used to eliminate/minimize frequency component in any frequency range of concern such that a firing controller designer can readily customize a controller to suppress whatever frequency range (or ranges) are of concern to the designer.

The skip fire firing control unit 120 receives an input signal 110 indicative of a desired engine output and is arranged to generate a sequence of firing commands (drive pulse signal 113) that together cooperate to cause engine 150 to provide the desired output using skip fire engine control. The firing control unit 120 includes a requested firing fraction calculator 122, an adjusted firing fraction calculator 124, a power train parameters adjusting module 133 and a drive pulse generator 130.

In FIG. 1, the input signal 110 is shown as being provided by a torque calculator 80, although it should be appreciated that the input signal can come from any other suitable source. The torque calculator 80 is arranged to determine the desired engine torque at any given time based on a number of inputs. The torque calculator outputs a desired or requested torque 110 to the firing fraction calculator 90. In various embodiments, the desired torque may be based on a number of inputs that influence or dictate the desired engine torque at any given time. In automotive applications, one of the primary inputs to the torque calculator is typically the accelerator pedal position (APP) signal 83 which indicates the position of the accelerator pedal. Other primary inputs may come from other functional blocks such as a cruise controller (CCS command 84), the transmission controller (AT command 85), a traction control unit (TCU command 86), etc. There are also a number of factors such as engine speed that may influence the torque calculation. When such factors are utilized in the torque calculations, then the appropriate inputs, such as engine speed (RPM signal 87) are also provided or are obtainable by the torque calculator as necessary. It should be appreciated that in many circumstances, the functionality of the torque calculator 80 would be provided by the ECU. In other embodiments, the signal 110 may be received or derived from any of a variety of other sources including an accelerator pedal position sensor, a cruise controller, etc.

The requested firing fraction calculator 122 is arranged to determine a skip fire firing fraction that would be appropriate to deliver the desired output under selected engine operating conditions (e.g. using operating parameters that are optimized for fuel efficiency, although this is not a requirement). The firing fraction is indicative of the percentage of firings under the selected operating conditions that would be required to deliver the desired output. In one preferred embodiment, the firing fraction is determined based on the percentage of optimized firings that would be required to deliver the driver requested engine torque compared to the torque that would be generated if all cylinders were firing at an optimum operating point. However, in other instances, different level reference firings may be used in determining the appropriate firing fraction.

The requested firing fraction calculator 122 may take a wide variety of different forms. By way of example, in some embodiments it could simply scale the input signal 110 appropriately. However, in many applications it will be desirable to treat the input signal 110 as a requested torque or in some other manner. It should be appreciated that the firing fraction is not generally linearly related to the requested torque, but rather may depend on a variety of variables such as the engine speed, transmission gear and other engine/drive train/vehicle operating parameters. Therefore, in various embodiments, the requested firing fraction calculator 122 may consider current vehicle operating conditions (e.g. engine speed, manifold pressure, gear etc.), environmental conditions and/or other factors in determining the desired firing fraction. Regardless of how the appropriate firing fraction is determined, the requested firing fraction calculator 122 outputs a requested firing fraction signal 123 indicative of a firing fraction that would be suitable to provide the desired output under the reference operating conditions. The requested firing fraction signal 123 is passed to adjusted firing fraction calculator 124.

As discussed above, a characteristic of some types of skip fire engine controllers is that they may sometimes direct the use of firing sequences which can introduce undesirable engine and/or vehicle vibrations. The adjusted firing fraction calculator 124 is generally arranged to either (a) select a firing fraction close to the requested firing fraction that is known to have desirable NVH characteristics; or (b) to suppress or prevent the use of firing fractions that are most likely to generate undesirable vibrations and/or acoustic noise. The adjusted firing fraction calculator 124 may take a wide variety of different forms as will be described in more detail below. The output of adjusted firing fraction calculator 124 is commanded operational firing fraction signal 125 which is indicative of the effective firing fraction that the engine is expected to output. The commanded firing fraction 125 may be directly or indirectly fed to drive pulse generator 130. The drive pulse generator 130 is arranged to issue a sequence of firing commands (e.g., drive pulse signal 113) that cause the engine to deliver the percentage of firings dictated by the commanded firing fraction signal 125.

The drive pulse generator 130 may also take a wide variety of different forms. For example, in one described embodiment, the drive pulse generator 130 takes the form of a first order sigma delta converter. Of course, in other embodiments, numerous other drive pulse generators could be used including higher order sigma-delta controllers, other predictive adaptive controllers, look-up table based converters, or any other suitable converter or controller which is arranged to deliver the firing fraction requested by the commanded firing fraction signal 125. By way of example, many of the drive pulse generators described in the assignees other patent applications may be used in this firing control architecture as well. The drive pulse signal 113 outputted by the drive pulse generator 130 may be passed to an engine control unit (ECU) or combustion controller 140 which orchestrates the actual firings.

Since the commanded firing fraction signal 125 may command the firing of a different percentage of the possible firing opportunities than was determined by the requested firing fraction calculator 122, it should be appreciated that the output of the engine would not necessarily match the drivers request if no appropriate adjustments are made. Therefore, the firing controller 120 may include a power train parameter adjusting module 133 that is adapted to adjust selected power train parameters to adjust the output of each firing so that the actual engine output substantially equals the requested engine output. By way of example, if the requested firing fraction 123 is 48% at the reference firing conditions, and the commanded firing fraction 125 is 50%, then the engine parameters may be adjusted such that the torque output of each firing is approximately 96% of the reference firing. In this way, the firing controller 120 insures that the delivered engine output substantially equals the engine output requested by input signal 110.

There are a variety of ways in which the engine parameters can be adjusted to alter the torque provided by each firing. One effective approach is to adjust the mass air charge (MAC) delivered to each fired cylinder and to allow the engine control unit (ECU) 140 to provide the appropriate fuel charge for the commanded MAC. This is most easily accomplished by adjusting the throttle position which in turn alters the intake manifold pressure (MAP). However, it should be appreciated that the MAC can be varied using other techniques (e.g. altering the valve timing) and there are a number of other engine parameters, including fuel charge, spark advance timing, etc. that may be used to alter the torque provided by each firing as well. If the controlled engine permits wide variations of the air-fuel ratio (e.g. as is permitted in most diesel engines), it is possible to vary the cylinder torque output by solely adjusting the fuel charge. Thus, the output per cylinder firing can be adjusted in any way that is desired in order to ensure that the actual engine output at the commanded firing fraction is substantially the same as the requested engine output.

In some modes of operation, cylinders are deactivated during skipped firing opportunities. That is, in addition to not fueling the cylinders during skipped working cycles, the valves are kept closed to reduce pumping losses. During active firing opportunities where the corresponding cylinders are fired, the cylinders are preferably operated under conditions (e.g., valve and spark timing, and fuel injections levels) near or at their optimum operating region, such as an operating region corresponding to optimum fuel efficiency. Although it is believed that optimizing fuel efficiency will be one of the primary objectives in many implementations, it should be appreciated that increased torque or reduced emissions may also be factors in determining the optimum operating region in any particular application. Therefore, the characteristics of the reference or "optimal" firings may be selected in any way deemed appropriate by the controller designer.

In the embodiment illustrated in FIG. 1, a number of the components are diagrammatically illustrated as independent functional blocks. Although independent components may be used for each functional block in actual implementations, it should be appreciated that the functionality of the various blocks may readily be integrated together in any number of combinations. By way of example the requested firing fraction calculator 122, the adjusted firing fraction calculator 124 and the power train parameter adjusting module 133 can all readily be integrated together into a single firing fraction determining unit 224 (labeled in FIG. 4) or may be implemented as components incorporating a variety of different combinations of functional blocks. Alternatively the functionalities of the adjusted firing fraction calculator and the power train adjusting module may be integrated into a vibration control unit. The functionality of the various functional blocks may be accomplished algorithmically, in analog or digital logic, using lookup tables or in any other suitable manner. Any of the described components can also be incorporated into the logic of the engine control unit 140 as desired.

In one specific example, it should be appreciated that in the embodiment illustrated in FIG. 1, the requested firing fraction calculator 122 and the adjusted firing fraction calculator 124 cooperate to generate a signal indicative of the firing fraction that is desired and appropriate based upon the current accelerator pedal position and other operational conditions. Although the description of the functionality of these as two separate components helps explain the overall function of the firing fraction calculator, and the combination of these two components works well to select an appropriate firing fraction, it should be appreciated that the same or similar functionality can readily be accomplished via a number of other techniques. For example, in some embodiments a torque request can be converted directly to the desired firing fraction. The torque request may be the result of a desired torque calculation (e.g., by the ECU or other component that effectively acts as a torque calculator), it may be derived directly or indirectly from the accelerator pedal position, or it may be provided by any other suitable source.

In other embodiments, a multi-dimensional lookup table may be used to select the desired firing fraction without the separate step of calculating or determining a requested firing fraction. By way of example, in one specific implementation, the lookup table could be based upon (a) the accelerator pedal position; (b) the engine speed (e.g. RPM); and (c) the transmission gear. Of course, a variety of other indices including manifold absolute pressure (MAP), engine coolant temperature, and cam setting (i.e. valve opening, and closing times), spark timing, etc. can be used as well in other specific implementations. One advantage to using lookup tables is that modeling allows the engine designers to customize and predesignate the firing fractions that will be used for any particular operating conditions. Such selections can be customized to incorporate the desired trade-offs for vibration mitigation, acoustic characteristics, fuel economy and other competing and potentially conflicting factors. Such a table could also be arranged to identify the appropriate mass air charge (MAC) and/or other appropriate engine settings for use with the selected firing fraction to provide the desired engine output thereby incorporating the functionality of power train parameters adjusting module 133 as well.

Any and all of the described components may be arranged to refresh their determinations/calculations very rapidly. In some preferred embodiments, these determinations/calculation are refreshed on a firing opportunity by firing opportunity (also referred to as a working cycle by working cycle) basis although that is not a requirement. An advantage of the firing opportunity by firing opportunity operation of the various components is that it makes the controller very responsive to changed inputs and/or conditions (especially when compared to controllers that can only respond after an entire pattern of firings has been completed or after other set delays). Although firing opportunity by firing opportunity operation is very effective, it should be appreciated that the various components (and especially the components before the firing controller 130) can be refreshed more slowly while still providing acceptable control (as for example by refreshing every revolution of the crankshaft, etc.).

In many preferred implementations the firing controller 130 (or equivalent functionality) makes a discrete fire/no fire decision on a firing opportunity by firing opportunity basis.

This does not mean that the decision is necessarily made at the same time the combustion event occurs, because some lead time may be required to properly vent and fuel the cylinder. Thus, the firing decisions are typically made contemporaneously, but not necessarily synchronously, with the firing events. That is a firing decision may be made immediately preceding or substantially coincident with the firing opportunity working cycle, or it may be made one or more working cycles prior to the actual firing opportunity. Furthermore, although many implementations independently make the firing decision for each working chamber firing opportunity, in other implementations it may be desirable to make multiple (e.g., two or more) decisions at the same time.

In some preferred embodiments, the firing control unit 120 may operate off a signal synchronized with the engine speed and cylinder phase (e.g., to top dead center (TDC) on cylinder 1 or some other reference). The TDC synchronization signal may serve as a clock for the firing control unit. The clock may be configured so that it has a rising digital signal that corresponds with each cylinder firing opportunity. For example for a six cylinder, 4-stroke engine the clock may have three rising digital signals per engine revolution. The rising digital signal in successive clock pulses may be phased to substantially match the TDC (top dead center) position of each cylinder at the end of its compression stroke, although this is not a requirement. Thus, the phase relationship between the clock and engine may be chosen for convenience and different phase relationships may also be used.

Cyclic Pattern Generator

Figure 2:
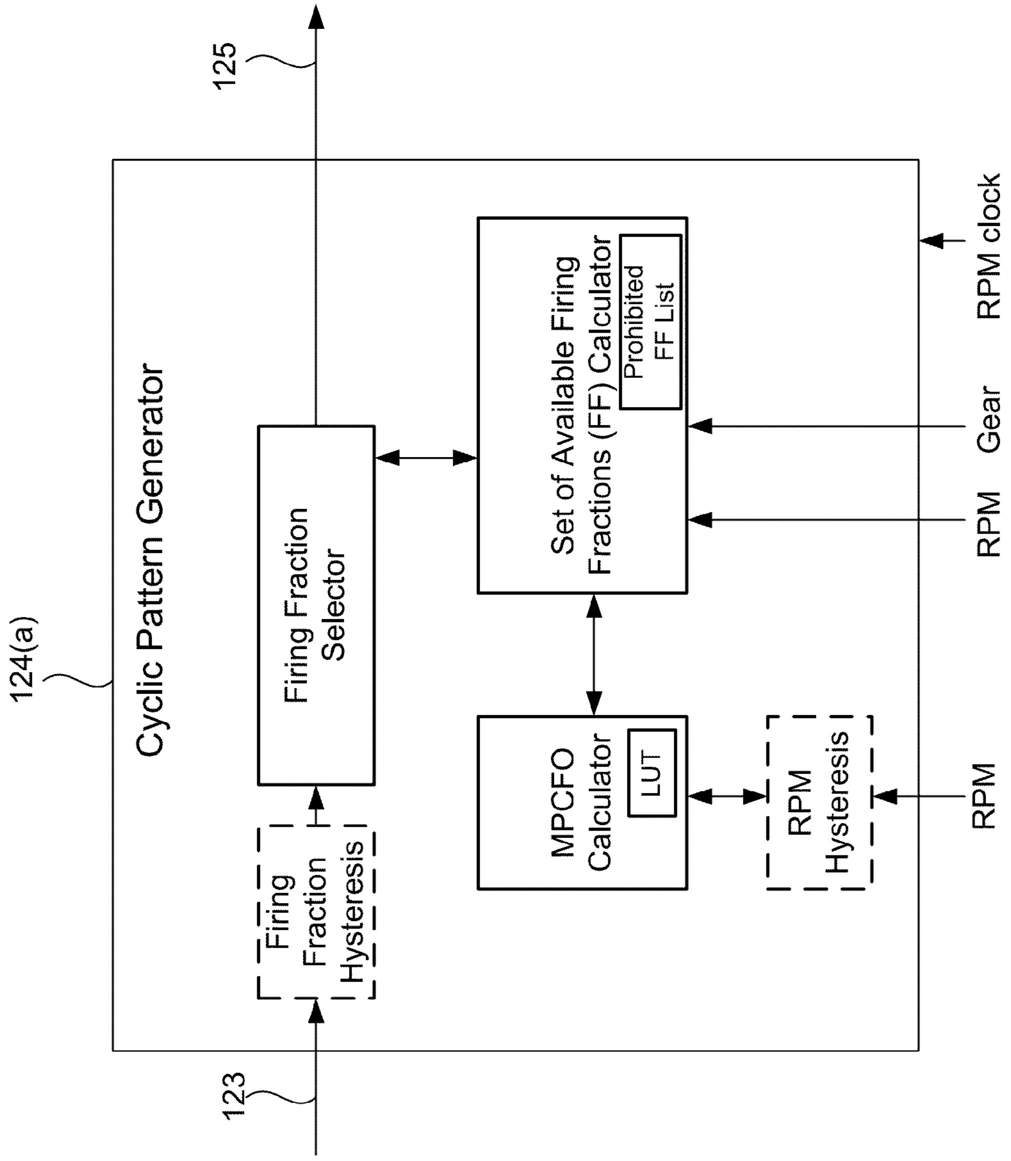
FIG. 2 is a block diagram illustrating a cyclic pattern generator suitable for use as an adjusted firing fraction calculator.

Referring next to FIG. 2, one specific implementation of an adjusted firing fraction calculator 124 sometimes referred to herein as a cyclic pattern generator (CPG) 124(*a*) will be described in more detail. Conceptually, the cyclic pattern generator 124(*a*) is arranged to determine an operating firing fraction that is close to the requested firing fraction while attempting to insure that the resulting firing sequence eliminates or minimizes firing frequency components in the frequency range of maximum human sensitivity. There have been a number of studies involving the effects of vibrations on vehicle occupants. For example, the ISO 2631 provides guidance regarding the impact of vibration on vehicle occupants. In general, vibrations at frequencies between 0.2 and 8 Hz are considered to be among the worst types of vibration from the passenger comfort perspective (although of course, there are a number of competing theories as to the most relevant boundaries). Therefore, in some implementations, it is desirable to operate the engine in a control mode which minimizes vibration frequencies in this range (or whatever range(s) is/are of most concern to the vehicle/engine designer).

In the first described embodiment, this is accomplished, in part, by ensuring that a firing "pattern" or "sequence" is used that repeats at a frequency that exceeds a designated threshold. As such, the cyclic pattern generator 124(*a*) effectively acts as a filter to reduce low frequency content which may be present in the firing fraction determined by the requested firing fraction calculator. The actual repetition threshold may vary according to the needs of any particular application, but generally it is believed that minimum repetition thresholds on the order of 6-12 Hz work well in many applications. For the purpose of illustration, the example below utilizes a minimum repetition threshold of 8 Hz, which is been found to be appropriate in many applications. However it should be appreciated that the actual threshold level used may vary between applications and that in certain applications the threshold may actually vary some based on operational conditions (e.g., such as engine speed).

Returning to the example, if a cyclic firing pattern is selected that repeats eight or more times per second, then we can be fairly confident that the firing pattern itself will have no or minimal fundamental frequency components below 8 Hz. In other words, if the firing pattern is periodic and the number of repetitions of the cyclic pattern is 8 or more per second, then the engine will operate with minimum vibration below 8 Hz. In such an embodiment, the adjusted firing fraction calculator 124(*a*) illustrated in FIG. 2, is arranged to cause the drive pulse generator 130 to output a repeating pattern of firing instructions that repeats at least 8 times per second (i.e. at or above the repetition threshold).

To better illustrate the concept, consider a four-stroke, six cylinder engine operating at 2400 RPM with a desired repetition threshold of 8 Hz. Such an engine would have 7200 firing opportunities per minute or 120 firing opportunities per second. Thus, as long as a repeating firing sequence (referred to herein as a cyclic firing sequence) is used that does not extend more than 15 firing opportunities (i.e., 120 firing opportunities per second divided by 8 Hz) it can be assumed that the cyclic firing pattern itself will not have frequency components below 8 Hz.

One way to implement this approach is to calculate the maximum number of firing opportunities that may be used in a repeating sequence without risking the introduction of frequency components below the desired threshold (e.g. 8 Hz). This value is referred to herein as the maximum possible cyclic firing opportunity (MPCFO) and can be calculated by dividing the firing opportunities per second by the desired minimum vibration frequency. The MPCFO may also be determined using a lookup table (LUT). In this example MPCFO=120/8=15. Any fractional value of the MPCFO can be rounded down or truncated to avoid frequency content in an unwanted frequency range. Note that MPCFO is a dimensionless number reflecting firing opportunities per cycle, since it reflects the ratio of the firing opportunity frequency to the minimum desired vibration frequency.

Figure 8:
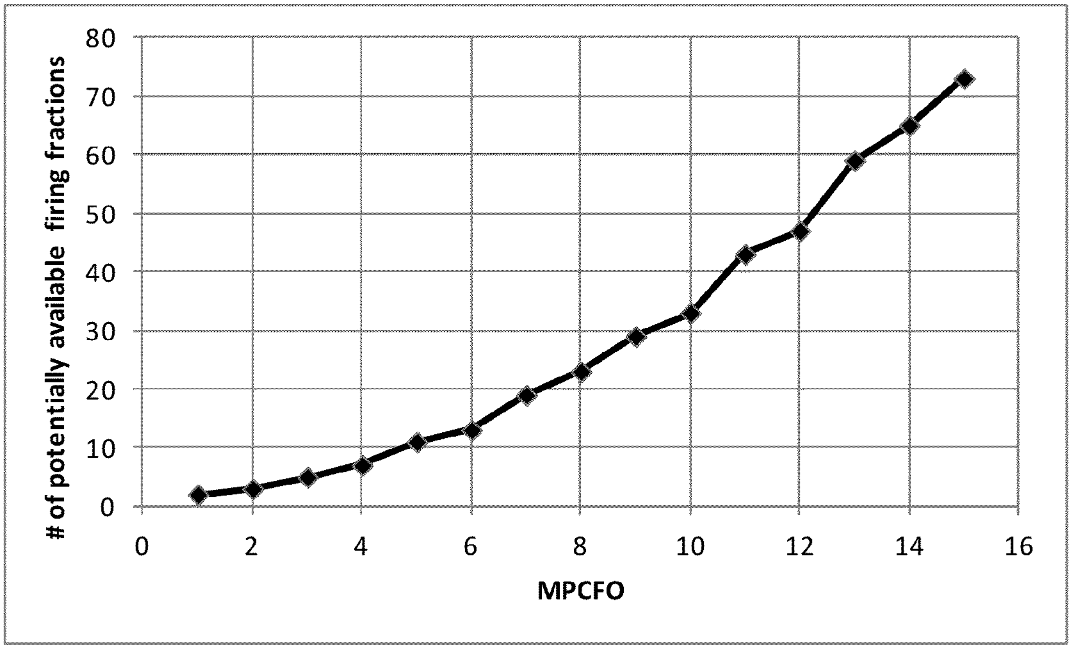
FIG. 8 is a graph of the number of potentially available firing fractions as a function of the maximum possible cyclic firing opportunities.

Taking the MPCFO as 15, the various possible operational firing fractions that insure repetition of a firing sequence at or above the desired frequency can be determined by considering all possible fractions with 15 or less in the denominator. These possible operating firing fractions include: $\frac{15}{15}$, $\frac{14}{15}$, $\frac{13}{15}$, $\frac{12}{15}$, $\frac{11}{15}$ . . . $\frac{3}{15}$, $\frac{2}{15}$, $\frac{1}{15}$; $\frac{14}{14}$, $\frac{13}{14}$, $\frac{12}{14}$, . . . $\frac{3}{14}$, $\frac{2}{14}$, $\frac{1}{14}$; etc. repeating such a pattern for denominator values of 13 thru 1. Review of the various possible operational firing fractions indicates that there are 73 unique possible operational firing fractions for an MPCFO of 15 (i.e., eliminating duplicate values since a number of the fractions, e.g., $\frac{6}{15}$. $\frac{4}{10}$, $\frac{2}{5}$ will be repetitive). This set of possible firing fraction may be treated by the adjusted firing fraction calculator 124(*a*) as the set of available operational firing fractions associated with an MPCFO of 15. It should be appreciated that the MPCFO will vary as a function of engine speed and that different MPCFOs would have different sets of available operational firing fractions. To further illustrate this point, FIG. 8 is a graph that illustrates of the number of potentially available firing fractions as a function of the MPCFO.

The set of available operational firing fractions that insure that the firing sequence will repeat at a rate that exceeds the minimum repetition threshold can readily be determined dynamically during operation of the engine. This determination can be calculated algorithmically; found through the use of look up tables or other suitable data structures; or by any other suitable mechanism. It should be appreciated that this is very easy to implement in part because the MPCFO is quite easy to calculate and each unique MPCFO will have a fixed set of permissible firing fractions.

In general, the set of available firing fractions that are identified using the MPCFO calculation approach may be considered a set of candidate firing fractions. As will be discussed in more detail below, it may also be desirable to further exclude some selected specific firing fractions because they excite vehicle resonances or cause unpleasant noise. The excluded firing fractions may vary depending on power train parameters, such as the transmission gear ratio.

Figure 3:
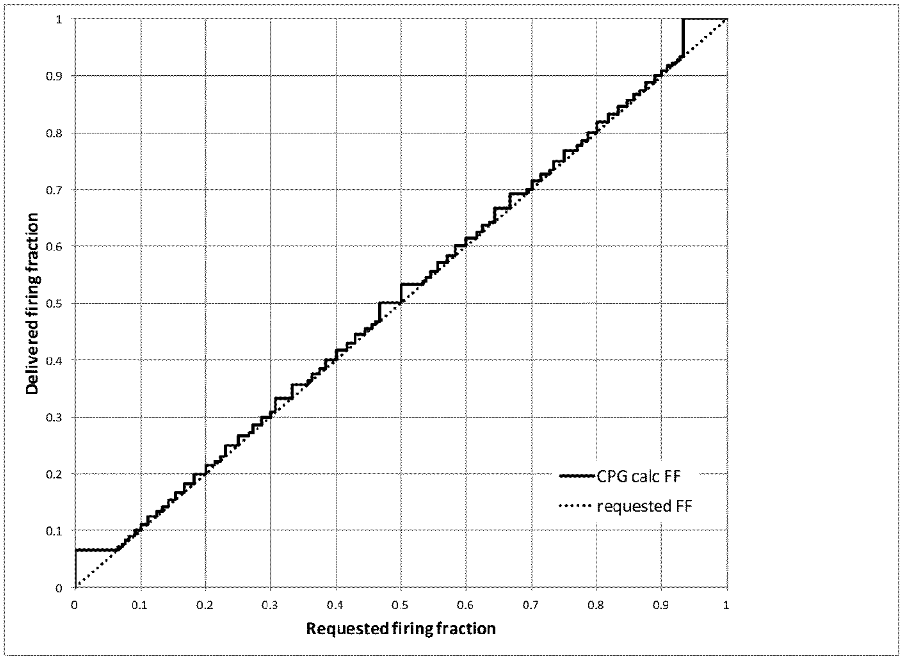
FIG. 3 is an exemplary graph comparing the delivered firing fraction to the requested firing fraction at a selected engine speed using a cyclic pattern generator in accordance with FIG. 2.

The cyclic pattern generator 124(*a*) is generally arranged to select the most appropriate of the available operational firing fractions at any given engine speed. It should be apparent that much (indeed most) of the time, the commanded firing fraction 125 will be different, albeit relatively close to, the requested firing fraction 123. FIG. 3 is an exemplary graph comparing the requested firing fraction with the delivered firing fraction as might be generated by a representative adjusted firing fraction calculator 124 in a circumstance where the MPCFO is 15. As can be seen in FIG. 3, the use of only a finite number of discrete firing fractions results in a stair step type delivered firing fraction behavior.

As pointed out above, the requested firing fraction 123 is determined based upon the percentage of firings that would be appropriate to deliver the desired engine output under specified firing conditions (e.g., optimized firings). When the commanded firing fraction 125 is different than the requested firing fraction 123, the actual output of the engine 150 would not match the desired output if the cylinders are fired under exactly the same conditions as contemplated in the determination of the requested firing fraction. Therefore, the power train parameter adjusting module 133 (which may optionally be implemented as part of adjusted firing fraction calculator 124(*a*)) is also arranged to adjust some of the engine's operational parameters appropriately so that the actual engine output when using the adjusted firing fraction matches the desired engine output. Although the power train parameter adjusting module 133 is illustrated as a separate component, it should be appreciated that this functionality can readily be (and often will be) incorporated into the ECU or other appropriate component. As will be appreciated by those skilled in the art, a number of parameters can readily be altered to adjust the torque delivered by each firing appropriately to ensure that the actual engine output using the adjusted firing fraction matches the desired engine output. By way of examples, parameters such as throttle position, spark advance/timing, intake and exhaust valve timing, fuel charge, etc., can readily be adjusted to provide the desired torque output per firing.

As can be seen in FIG. 3, for all requested firing fraction levels except those near 0 and 1, the discrete firing fraction levels output by the cyclic pattern generator 124(*a*) are relatively close to the requested levels. As described in other places, when the requested firing fraction is near 1, it may be preferable to run the engine in a normal operating mode as opposed to a skip fire operational mode. When the requested firing fraction would be near zero (as for example when the engine is idling) it may be preferable to either run the engine in a normal (non-skip-fire) operating mode, or to reduce the output of each firing so that a higher firing fraction is required. From a control standpoint, this is easily accomplished by: (a) simply reducing the reference firing output utilized in the requested firing fraction calculator 123; and (b) adjusting the engine parameters accordingly.

As will be discussed in more detail below, the cyclic pattern generator 124(*a*) (or other adjusted firing fraction calculators) may optionally include an RPM hysteresis module and a firing fraction hysteresis module. These modules serve to minimize unnecessary fluctuations in the CPG level due to minor changes in engine speed or requested torque. The hysteresis thresholds may vary as a function of engine speed and requested torque. Also the hysteresis thresholds may be asymmetric depending on whether an increase or decrease of torque is requested. The hysteresis levels may also vary as a function of power train parameters, such as the transmission gear ratio or other vehicle parameters, such as whether the brake is being applied.

Noise

The cyclic pattern generating approach described above is very effective at reducing engine vibrations. However, there are some potential drawbacks of using repetitive patterns if not appropriately addressed. First, as will be explained in more detail below, the repetitive nature of the pattern itself can cause a resonance or beat frequency to become excited, resulting in a droning or thrumming sound. Second, some repetitive patterns result in cylinders being skipped for extended periods which can cause thermal, mechanical and/or control problems for the engine. In a V8 engine, all skip fire firing fractions that can be represented as a fraction N/8 have this potential problem. For example, a firing fraction of ½ could potentially consistently fire one set of four cylinders and never fire the other four (which could be desirable or not desirable based on the specific cylinders being fired). Similarly, a firing fraction of ⅛ may consistently fire one cylinder, but never the other seven. Other fractions may also exhibit this property. Of course, other sized engines have similar concerns.

To better understand the nature of the acoustic beat problem, consider a commanded firing fraction of ⅓ which tends to run very smoothly in many types of engines. In this arrangement the firing fraction can be implemented by firing every third cylinder. A four stroke V8 engine running at 1500 RPM firing every third cylinder will result in a fundamental frequency of 33⅓ Hz. With such a high firing frequency, little vibration is detected by the driver. Unfortunately, the regularity of the resulting pattern can create acoustic issues. Specifically, the sequence of actual cylinder firing repeats every 24 chances to fire. Therefore, if the individual cylinder firings have slightly different acoustics characteristics (which is not uncommon due to factors such as exhaust system design, etc.), a 4.2 Hz acoustic beat can result. Such a beat can occur because although firing every third cylinder results in a fundamental frequency of 33⅓ Hz, at 1500 RPM, the exact same cylinder firing pattern repeats every 24 firing opportunities in an eight cylinder engine. At 1500 RPM, there are 100 firing opportunities per second resulting in the repetition of the exact same cylinder sequence about 4.2 times per second (i.e., $100 \div 24 \approx 4.2$). Thus, there is the potential for generating a beat frequency of approximately 4.2 Hz. Such a beat is sometimes discernible by a vehicle occupant and when perceptible, can become annoying acoustically. On the other hand, the beat frequency is low enough that it takes some time before an observer will recognize it. Thus, when a vehicle is driven at the same firing fraction continuously for several seconds, acoustic resonances can become noticeable that would not otherwise be noticeable. Of course, there can be a number of other resonance beats that can be excited as well.

In practice, it has been observed that in some engines, a few of the permitted cyclic firing patterns/firing fractions generate undesirable acoustics. Indeed, some of the smoothest firing fractions such as ⅓ and ½ are sometime susceptible to undesirable acoustics. In some circumstances, the undesirable acoustics are associated with the types of resonant beat frequencies discussed above, which appear to be related to characteristics and/or resident frequencies of the exhaust path. In other circumstances, (e.g., when ½ is used) the noises may be associated with switching to or between cylinder banks or groups. For any particular engine and any particular vehicle (with their associated exhaust system, etc.), the firing fraction/engine speed combinations that generate undesirable acoustic noise can readily be identified. Such identification can be accomplished either experimentally or analytically.

The acoustic noise problem can be addressed in a number of different ways. For example, the firing fraction(s) that are susceptible to the generation of undesirable acoustic noises can relatively readily be identified empirically and the adjusted firing fraction calculator can be designed to preclude the use of such fractions under specific operating conditions. In one such an arrangement, the next higher or the next closest firing fraction may be used in place of a firing fraction that is perceived to be likely to generate acoustic noise. In other embodiments, the commanded firing fraction may be offset a slight amount from the calculated firing fractions as will be described in more detail below. Although the acoustic noise problem has been first discussed in the context of the cyclic pattern generator 124(*a*), it should be appreciated that the fundamental acoustic concerns are applicable to the design of any firing fraction determining unit.

It has also been observed that the acoustic noise concerns are not always strictly a function of firing fraction. Rather, other variables including engine speed, gear, etc. may have an effect on the acoustics of engine operation. Therefore, the adjusted firing fraction determining unit may be arranged to avoid the use of any firing fraction/engine speed/gear combinations that generate such undesirable acoustic noise. In embodiments that utilize a lookup table to determine the appropriate adjusted firing fraction 125, any firing fraction with undesirable acoustic characteristics can simply be eliminated from the available set of firing fractions. In embodiments that calculate the commanded firing fraction 125 in real time (e.g., algorithmically or using logic), a proposed firing fraction can initially be calculated and thereafter the proposed firing fraction can be checked to ensure that is not a prohibited firing fraction. If it turns out that a proposed firing fraction is prohibited, a nearby firing fraction (e.g., the next higher firing fraction) may be selected in place of the prohibited firing fraction. Such a check can be made using any suitable technique. By way of example a lookup table that uses engine speed as an index could be used to identify the potential firing fractions that are prohibited for any given engine speed.

Another approach would be to simply add a factor to the prohibited firing fraction that adequately mitigates the acoustic noise. For example, if a proposed firing fraction such as $1/3$ is known to have undesirable acoustic characteristics, a different firing fraction (e.g. $17/50$, or $7/20$) could be used in its place. These fractions have almost the same firing frequency as $1/3$, so only a small reduction in per firing torque will be required to have the output torque substantially match the requested torque. Again, the actual offset may be preset or calculated based on specific engine operating conditions.

Another mechanism that can be useful in addressing potential acoustic concerns is to sometimes break the repeating patterns that are generated by the firing controller. This may also be desirable to prevent thermal and mechanical issues from arising in situations where only certain cylinders are being fired/not fired. One approach to breaking the cyclic pattern is to cause the controller to occasionally add an extra firing. This can be accomplished in a number of ways. In the embodiment illustrated in FIG. 4, an extra firing inserter 272 is provided which can be programmed to sometimes increase the value input into the firing controller 230 by a small amount. This has the impact of increasing the requested firing fraction and will cause some extra firings. For example, if the inserter increases the commanded firing fraction by 1% for an extended period, then the firing controller will provide an extra firing every 100 firing opportunities. The frequency and general timing of the extra firings can be varied to meet the needs of any particular design, but generally it is desirable to keep the number of extra firings quite low so that they do not significantly affect the overall engine output. By way of example, increasing the percentage of firings directed by the commanded firing fraction signal 125 on the order of 0.5% to 5% is generally sufficient to break the patterns enough to significantly reduce acoustic noise. In the illustrated embodiment, the inserter is located upstream of the firing controller 230. However, it should also be apparent that the extra firings can be introduced into the firing control unit logic at a variety of locations to accomplish the same function.

The inserter 272 can also be programmed to insert additional firings (e.g. increase the firing fraction) only in association with specific firing fractions (e.g., firing fractions which are understood to have acoustic or other concerns). Conversely, the inserter can be arranged to not insert additional firings in association with specific firing fractions. In one particular implementation, the inserter may include a two dimensional look-up table which is used to identify the frequency of the extra firing insertion (which could be zero, positive or negative for any particular operating state), with one of the indices being requested torque or commanded firing fraction and the other being engine speed. Of course, higher or lower dimension lookup tables, and tables that use other indices (e.g. gear) and/or a variety of algorithmic and other approaches could be used to determine the frequency of insertion as well. In some implementations it may be desirable to randomize the timing of the insertions as well. In still others, it may be desirable to vary the magnitude of the insertion over time (e.g., for a steady state input, increase by 1% for a first short period, followed by a 2% insertion and then by no insertion). Thus, the nature of the insertion can be widely varied to meet the needs of any particular application.

Another approach to breaking the pattern is to introduce dither to the CPG command signal. Dither may be considered a random noise like signal that is superimposed on a main or second signal. If desired, the dither can be introduced by the inserter 272 in addition to, or in place of, the additional firings. In other implementations, the dither (or any of the other functions of inserter 272) may be introduced internally within the firing controller 230.

Still other approaches to mitigating acoustic issues are discussed below with respect to FIGS. 6 and 7. Furthermore, it should be appreciated that some acoustic issues may be addressed through vehicle mechanical design in addition to the control of the firing fraction and firing sequence. A tradeoff may exist between complexity in the firing sequence control algorithm and the vehicle mechanical design where a cost effective engineering solution may be determined by those skilled in the art.

Smoothing Operation

It has been observed that in conventional skip fire controllers (which typically utilize a small set of effective firing fractions), some of the more noticeable engine roughness tends to be associated with transitions between different firing patterns. One feature of the skip fire controller described above with respect to FIG. 1, is that the sigma delta based firing controller (drive pulse generator) 130 inherently spreads the firing commands, even in the midst of changes in the commanded firing fraction. It should be appreciated that this spreading of the firing commands has several desirable effects. Initially, the spreading tends to smooth the operation of the engine at any given firing fraction since the firings tend to be fairly evenly spread. Additionally, the spreading helps smooth transitions between different firing fractions since the accumulator function of the sigma delta converter effectively tracks the portion of a firing that has previously been requested but not delivered—and therefore transitions between firing fractions tend not to be as disruptive as would be observed without such tracking. Stated another way, the sigma delta converter effectively tracks the portion of a firing that has been requested (e.g. requested by the commanded firing fraction signal 125) but has not yet been directed (e.g. directed in the form of drive pulse signal 113). This tracking or "memory" of recent firing facilitates transition between one firing fraction and the next at any point in the firing sequence which is quite advantageous. That is, there is no need for a pattern to complete a cycle before a different firing fraction can be commanded.

Still further, some of the described implementations contemplate the use of an engine speed (RPM) based clock. One potential complication of using an RPM based clock is that every cylinder firing tends to cause a noticeable change in engine RPM. From a control standpoint, this effectively amounts to jitter in the clock which can adversely affect the controller. Another benefit of the more even spreading of the firings in controllers that use an RPM clock is that the spreading also tends to reduce the adverse effects of clock jitter.

Figure 4:
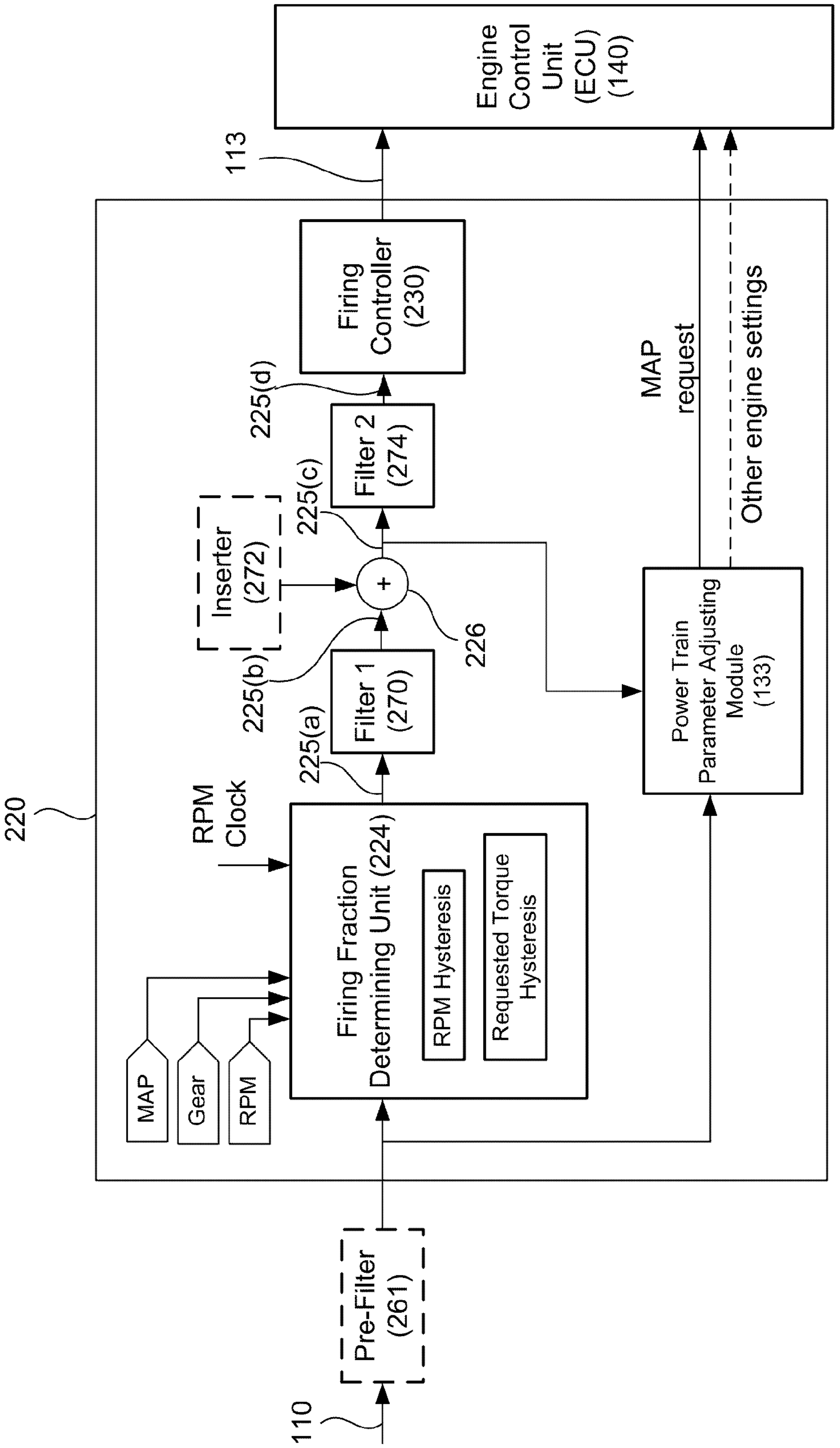
FIG. 4 is a block diagram illustrating another alternative skip fire based engine firing control unit that incorporates selected transition management and pattern breaking features.

Although sigma-delta based firing controllers (and other similar types of converters) do a tremendous amount to smooth engine operation, there are a number of other control features that can be used to help further smooth the engine operation. Referring again to FIG. 4, several additional components and control methodologies that may be added to or used with any of the described skip fire controllers to further improve the smoothness and drivability of the controlled engine/vehicle will be described. In the embodiment of FIG. 4, firing control unit 220 includes a firing fraction determining unit 224, a pair of low pass filters 270, 274 and a firing controller 230 (and optionally inserter 272). In this embodiment the power train parameter adjusting module 133 is also responsible for determining the desired mass air charge (MAC) and/or other engine settings that are desirable to help ensure that the actual engine output matches the requested engine output. The firing controller 230 may take the form of a sigma delta converter or any other converter that delivers a commanded firing fraction.

It has been observed that during steady state operation, most drivers are not able to keep their foot perfectly still on the accelerator pedal while driving. That is, the foot of most drivers tends to oscillate up and down a bit during driving even when they are trying to hold the pedal steady. This is believed to be due in part to physiological considerations and due in part to inherent road vibrations. Regardless of the cause, such oscillations translate to minor variations in the requested torque which can potentially cause relatively frequent switches back and forth between adjacent firing fractions if the oscillations happen to cross a threshold which would normally cause the firing fraction calculator to switch between two different firing fractions. Such frequent switches back and forth between firing fractions are generally undesirable and typically do not reflect any intention of the driver to actually change the engine output. A variety of different mechanism can be used to mitigate the effect of such minor variations in the accelerator pedal signal 110. By way of example, in some embodiments a pre-filter 261 is provided to filter out such minor input signal oscillations. The pre-filter can be used to effectively eliminate some minor oscillatory variations in the input signal 110 that are believed to be unintended by the driver. In other embodiments, in addition to or in place of the pre-filter 261, the firing fraction determining unit 224 may be arranged to apply hysteresis to, or otherwise ignore minor oscillatory variations in, the accelerator pedal input signal 110 in the determination of the commanded firing fraction. This can readily be accomplished by the use of a hysteresis constant that requires the input signal 110 to change a set amount before any changes are made in the requested/commanded firing fraction. Of course, the value of such a hysteresis constant may be widely varied to meet the needs of any particular application. Similarly, rather than a constant, the hysteresis threshold may take the form of a percentage change in torque request or use other suitable threshold functions.

In still other applications, the torque hysteresis may be applied by a torque calculator, ECU or other component as part of the determination of the requested torque. The actual torque hysteresis thresholds used and/or the nature of the hysteresis applied used may widely vary to meet the desired design goals.

It is important to appreciate that constraining the relevant firing fraction determining unit 122, 224, etc. to only change the requested/commanded firing fraction in response to input signal variations of greater than a threshold amount does not mean that the firing control unit 120, 220 etc. does not deliver an actual engine output that tracks the drivers request. Rather, any smaller variations in the input signal may be handled in a more traditional way by varying engine settings (e.g. mass air charge) appropriately while using the same firing fraction.

One particularly noteworthy characteristic of some of the firing fraction calculators described herein is that the number of available firing fractions is, or may be, variable based on the operational speed of the engine. That is, the number of firing fractions that are available for use at higher engine speeds may be greater (and potentially significantly greater) than the number of firing fractions that are available for use at lower engine speeds. This characteristic is quite different than conventional skip fire controllers which are generally constrained to use a relatively small fixed set of firing fractions that are independent of engine speed. By way of example, algorithmic implementations of the cyclic pattern generator 124(*a*) described above are arranged to calculate the number and values of the possible operational firing fractions states dynamically during operation of the engine. As such, the set of possible operational firing fractions will change any time the integer value of the MPCFO changes. Of course, in other (e.g. table based) implementations, the thresholds at which more firing fractions become available may vary in different ways.

Regardless, since the commanded firing fraction may vary in part as a function of engine speed, there may be circumstances where small changes in engine speed could cause a change in the commanded firing fraction. It has been observed that transitions between firing fractions tends to be one potential source of undesirable vibrations and/or acoustic noises and that rapid fluctuations back and forth between adjacent firing fractions tend to be particularly undesirable. To help reduce the frequency of such fluctuations, the firing fraction determining unit 124, 124(*a*), 224 etc. may be arranged to provide a dynamic RPM based hysteresis so that relatively small variations in the engine speed do not cause changes in the firing fraction.

To better illustrate the nature of the problem, consider a firing control unit 120, 220 that utilizes a cyclic pattern generator (CPG) 124(*a*) to determine the commanded firing fraction. It should be appreciated that every cylinder firing may each cause a non-trivial change in engine speed (RPM). Thus, if the engine is operating at a speed close to a threshold between CPG levels, the successive firings and non-firings of specific cylinders could cause the controller to fluctuate back and forth between CPG levels and therefore commanded firing fractions, which would be undesirable. (Note that a range of input or requested firing fractions map to a common commanded firing fraction, i.e., a common CPG level). Therefore, in such an implementation, it is desirable to insure that a change in engine speed be above a minimum step value before the cyclic pattern generator 124(*a*) will actually change an initial CPG level to a different CPG level. The amount of RPM hysteresis applied in any particular controller design may be varied to meet the needs of the particular vehicle control scheme. However, by way of example, a formula that is appropriate for the described cyclic pattern generator 124(*a*) implementation is the following:

RPM Hysteresis=(High Pass Cutoff Frequency*120/# Cylinders)

where High Pass Cutoff Frequency is the repetition threshold indicative of the minimum number of times that a repeating pattern of firing instructions is expected to repeat each second—e.g. 8 Hz in the example provided above and #Cylinders is the number of cylinders that the engine has. As discussed above, in some implementations it may be desirable to vary the High Pass Cutoff Frequency as a function of engine speed, gear or other factors. In such implementations, the applied level of RPM hysteresis may also vary as a function of such factors.

In other applications, it may be desirable to use a predefined RPM hysteresis threshold (i.e., requiring engine speed changes of greater than a designated value (e.g., 200 RPM)) or a RPM hysteresis this is based on a percentage of engine speed (e.g., requiring engine speed changes of greater than a designated percentage of the engine speed (e.g., 5% of the nominal engine speed)). Of course the actual values used for such thresholds can be widely varied to meet the needs of any particular application.

In another specific implementation, a latch may be provided to hold a minimum engine speed value (e.g. RPM) that has been observed in recent fluctuations of the engine speed. The latched engine speed is then only increased when a change in engine speed that exceeds the RPM hysteresis is observed. This latched engine speed may then be used in various calculations that require engine speed as part of a calculation or look-up. Examples of such calculations might include the engine speed used in the calculation of the MPCFO, or as indices for various look-up tables, etc. Some of the advantages of using this minimum latched engine speed value in certain calculations is that: (a) it helps ensure a fast response to a reduction in the torque request (e.g. when the driver releases the accelerator pedal); and (b) to assure that the high pass cutoff frequency does not decrease below the requested value.

Transient Response

With the described firing fraction management based skip fire controllers, there would typically be a step change in the requested mass air charge (MAC) any time a change is made in the commanded firing fraction. However, in many circumstances, the response time of the throttle and the inherent delays associated with increasing or decreasing the air flow rate through the intake manifold to provide a requested change in MAC are such that if there is a step change in requested MAC, the amount of air that is actually available during the next few firing opportunities (i.e. the actual MAC) may be a bit different then the requested MAC. Therefore, in such circumstances the MAC actually available for the next commanded firing (or next few commanded firings) can be a bit different then the requested MAC. It is generally possible to predict and correct for such errors.

In the embodiment illustrated in FIG. 4, the output of the firing fraction calculator 224 is passed through a pair of filters 270, 274 before it is delivered to the firing controller 230. The filters 270 and 274 (which may be low pass filters) mitigate the effect of any step change in the commanded firing fraction such that the change in firing fraction is spread over a longer period. This "spreading" or delay can help smooth transitions between different commanded firing fractions and can also be used to help compensate for mechanical delays in changing the engine parameters.

In particular filter 270 smoothes the abrupt transition between different commanded firing fractions (e.g. different CPG levels) to provide better response to engine behavior and so avoid a jerky transient response. It is generally acceptable to operate at non-CPG levels during the transitions between the CPG levels, since the transient nature of the response avoids generating low frequency vibrations.

As previously discussed, when the firing fraction determining unit 224 directs a change in the commanded firing fraction, it will also typically cause the power train adjusting module 133 to direct a corresponding change in the engine settings (e.g., throttle position which may be used to control manifold pressure/mass air charge). To the extent that the response time of filter 270 is different than the response time(s) for implementing changes in the directed engine setting, there can be a mismatch between the requested engine output and the delivered engine output. Indeed, in practice, the mechanical response time associated with implementing such changes is much slower than the clock rate of the firing control unit. For example, a commanded change in manifold pressure may involve changing the throttle position which has an associated mechanical time delay and there is a further time delay between the actual movement of the throttle and the achievement of the desired manifold pressure. The net result is that it is often not possible to implement a commanded change in certain engine settings in the timeframe of a single firing opportunity. If unaccounted for, these delays would result in a difference between the requested and delivered engine outputs. In the illustrated embodiment, filter 274 is provided to help reduce such discrepancies. More specifically, filter 274 is scaled so its output changes at a similar rate to the engine behavior; for example, it may substantially match the intake manifold filling/unfilling dynamics.

In the embodiment illustrated in FIG. 4, the output 225(*a*) of the firing fraction determining unit 224 passes through filter 270 resulting in signal 225(*b*). If an inserter 272 is used, its output is added at this stage by adder 226 resulting in signal 225(*c*). Of course, if no inserter is used (or no insertion is applied), signals 225(*b*) and 225(*c*) would be the same. This signal 225(*c*) is preferably the commanded firing fraction that is seen and used by the power train parameter adjusting module 133 in determining the appropriate power train settings so that the engine settings are calculated appropriately to deliver the desired engine output for the commanded firing fraction taking into account the effects of filter 270 and (if present) inserter 272. However, the signal 225(*c*) is passed through filter 274 before it is actually delivered to the firing controller 230 as the commanded firing fraction 225(*d*). As described above, filter 274 is arranged to help account for the transient response delays inherent in changing engine settings. Thus, filter 274 helps insure that the firing fraction actually asked of the firing controller 230 accounts for such inherent delays.

It should be apparent that the delay in completing a commanded transition between firing fractions imparted by the filter 270 causes will be inconsequential to the overall engine response in most circumstances. However, there are times when such a delay may be undesirable, as for example when there is large change in the requested firing fraction. To accommodate such situations, the filters can incorporate a bypass mode that causes the output 225(*a*) of firing fraction determining unit 224 to be passed directly to the firing controller 230 when large changes in firing fraction are directed. The design of such bypass filters are well understood in the filter design arts. For example, the filter internal settings may be reinitialized in order to force the output of the filter to a predetermined value.

A variety of low pass filters designs may be used to implement both the low pass filters 270 and 274. The construction of the filters may be varied to meet the needs of any particular application. Alternatively, sensors can be arranged to feed signals into the firing control unit 220 that actively monitor the time evolution of the MAP. Given this information and an accurate MAP model, filter 274 may be adjusted based on this information. In some specific embodiments low pass IIR (infinite impulse response) filters are used as filters 270 and 274 and these have been found to work particularly well. Like the commanded firing fraction signal 225 and the firing controller 230, such an IIR filter is preferably clocked with each firing opportunity. The construction of a particular first order IIR filter design suitable for use in this application is explained next. Although a particular filter design is described, it should be appreciated that a wide variety of other low pass filters can be utilized as well including FIR (finite impulse response) filters, etc.

As will be appreciated by those familiar with the filter design art, the formula for a discrete first order IIR filter with a sampling time T would be:

$$Yn=CT*Xn+(1-CT)Y(n-1)$$

However, in the described embodiment, the clock is variable and is tied to engine speed. Therefore, to convert the first order IIR filter from a constant sample time to a variable sample time first order filter based on crankshaft angle, the coefficient has to be recalculated as follows:

$$CF=(CT/T)*(60/RPM)/(\#\text{Cylinder}/2)$$

$$CF=(2*CT/T)*(60/RPM)/(\#\text{Cylinder})$$

$$CF=K*(60/RPM)/(\#\text{Cylinder})$$

Where CT and CF are the coefficient of the filter are respectively for a time base "T" filter and an angle or firing fraction base "F" filter.

Therefore, the formula for a first order IIR filter with the same characteristics as the above-mentioned time based IIR filter would be:

$$YF=CF*XF+(1-CF)Y(F-1)$$

Although a particular first order IIR filter has been described, it should be appreciated that other filters, including higher order IIR filters and other appropriate filters could readily be used in place of the described discrete first order IIR filter.

Warping the Firing Fraction

In the approaches described above, a set of operational firing fractions that have good vibration (or NVH) characteristics are identified and the firing fraction determining unit 224 emphasizes the use of these firing fractions during operation of the engine. The set of operational firing fractions can be obtained analytically, experimentally or using other suitable approaches. Limiting a skip fire controller to using such firing fractions can significantly reduce engine vibration. One way to view this approach is to observe that ranges of requested torques are mapped to a single firing fraction resulting in a stair step type of mapping between the requested torque and the commanded firing fraction as illustrated in FIG. 3. Stated another way, in this approach, the commanded firing fraction remains constant over a range of torque requests (which in FIG. 3 is reflected as a range of requested firing fractions).

Figure 5:
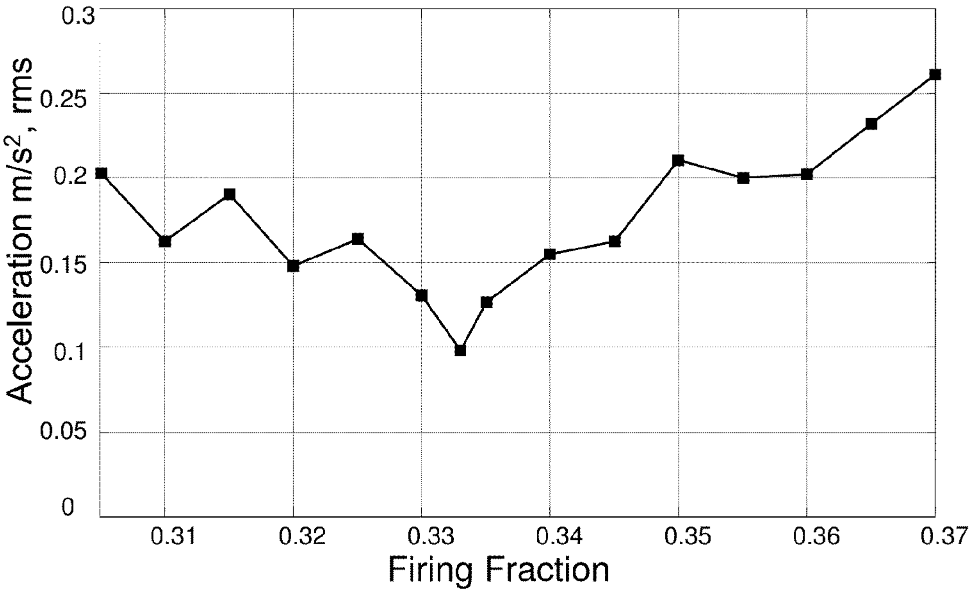
FIG. 5 is a graph illustrating the vibration (measured in longitudinal acceleration) that was observed while operating an engine over a small range of firing fractions.

In the embodiment described with respect to FIG. 2, one specific method is disclosed for identifying certain firing fraction values that are known to reduce the amount of vibration produced by engines operating in a skip fire mode. For the convenience of this description, those points may be referred to as CPG points although such points may be determined analytically, experimentally or using hybrid techniques. In practice, the observed vibrations will not spike dramatically with the use of firing fractions that are very close to, but not exactly the same as, a CPG point. Rather, although the relationship is far from linear, the vibration characteristics tend to be worse for firing fractions that are further away from any CPG points. This characteristic can be seen graphically, for example, in FIG. 5 which illustrates measured longitudinal acceleration (a particularly significant characteristic of vibration) at firing fractions in the vicinity of CPG point ⅓rd. This characteristic is exploited in an alternative adjusted firing fraction calculator 124(*b*) which will be described with reference to FIGS. 6-7.

Figure 6:
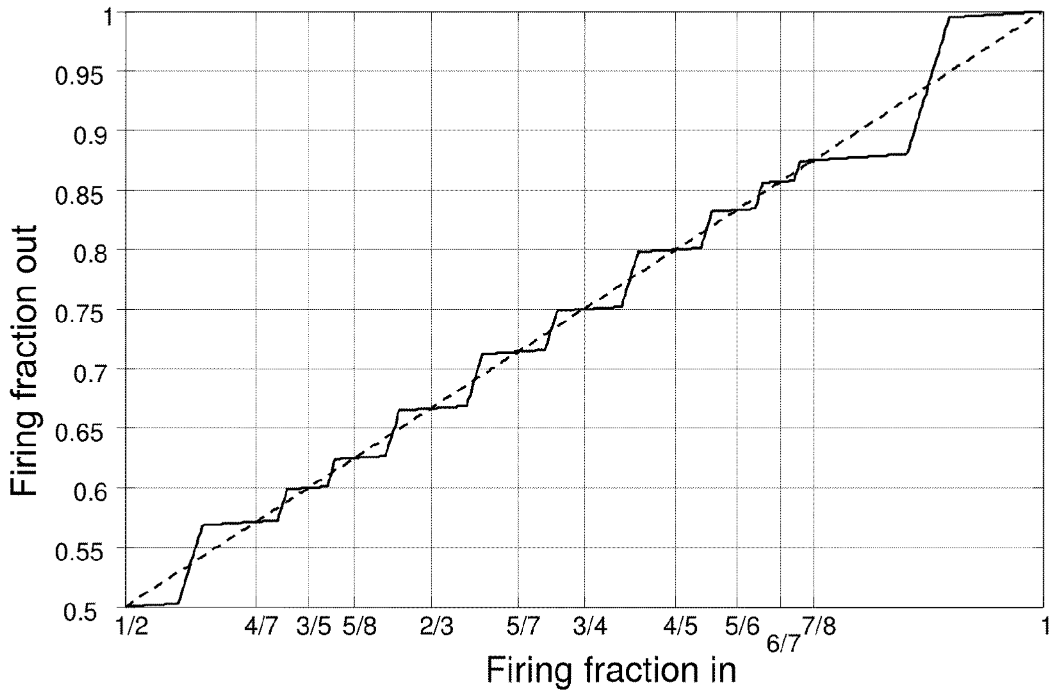
FIG. 6 is a graph comparing the delivered firing fraction with the requested firing in accordance with another embodiment of a firing control unit.
Figure 7:
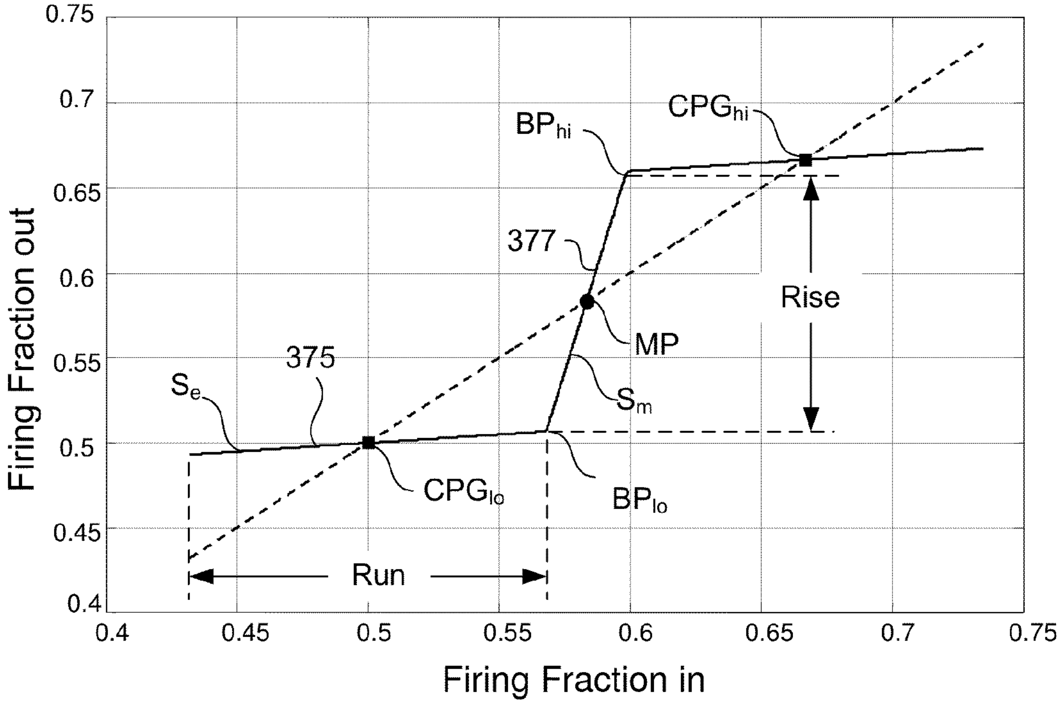
FIG. 7 is an enlarged segment comparing the delivered firing fraction to the requested firing fraction in a particular implementation.

In this embodiment, the adjusted firing fraction calculator 124 is arranged to map the requested firing fraction (or requested torque) to the commanded firing fraction in a manner that somewhat resembles the stair step type of approach of FIG. 3, but differs in that the run portion 375 of the "steps" are designed to have slight slopes (i.e., are not horizontal) while the rise portions 377 of the "steps" have much steeper slopes as can be seen in both FIGS. 6 and 7. Conceptually, a firing fraction calculator that maps requested torque (or requested firing fraction) to a commanded firing fraction 125 in this manner has several interesting characteristics.

By adding a slight slope to the run portion of the step, the commanded firing fraction 125 associated with a range of requested torques is warped so that it stays near a target CPG point, but is not constant. In this way, vibration is reduced since values that are close to CPG points tend to also have good vibration characteristics. At the same time, acoustic resonances are much less likely to be excited, particularly if the requested torque/firing fraction is constantly changing, even by small amounts. As pointed out above, studies have found that in reality, even in steady state driving conditions, the signal outputted from the accelerator pedal tends to oscillate somewhat. This inherent characteristic of the input signal can be exploited to help reduce acoustic resonances.

The rise portions of the steps can conceptually be considered to represent transitions between CPG stages. By inference, these transitional regions generally reflect regions with less desirable vibration characteristics. If the slope of the mapping in this region is relatively steep, then the transition between be CPG stages will be relatively rapid which means that probabilistically, the amount of time that the requested torque will be within these transitional regions is relatively low. By minimizing the time that the firing controller 130, 230 is instructed to output a firing fraction in these transitional regions, the likelihood of generating undesirable vibrations is substantially reduced and good NVH characteristics can be obtained.

There are many algorithms that can be used to generate a mapping of this nature. One simple approach is a piecewise-linear mapping. Such a mapping can readily be characterized by the following: (1) a set of desirable operation points (e.g., CPG points); (2) a parameter dictating the slope of the mapping around the operational points; and (3) a parameter dictating the slope of the mapping at the point midway between the operational points. The set of operational points may be identified using any suitable approach (e.g. algorithmically, experimentally, etc.). It is noted that the previously described CPG points work particularly well for this purpose, and the following description uses CPG points as the operational points. However, it should be appreciated that the use of CPG points is certainly not a requirement. The slope ($S_e$) of the mapping around the CPG points corresponds to the slope of the run portion 375 of the steps. This slope ($S_e$) will be less than one and preferably significantly less than one. By way of example, slopes of ⅓ or less, and more preferably 0.1 or less work well. The slope ($S_m$) of the mapping at the point midway between the CPG points corresponds to the slope of the rise portion 377 of the steps. This slope ($S_m$) will be greater than one (and preferably significantly greater than one, as for example 3 or greater, and more preferably 10 or greater). In the illustrated embodiment, the rise portion of the steps is centered at the midpoint between CPG points which works well, although again, this is not a strict requirement.

With this set of constraints, the mapping from input firing fraction to output firing fraction is completely determined. Given the above parameters, at any time the output firing fraction can be calculated using the following algorithm.

Step 1: Find the largest CPG point below the input firing fraction ($CPG_{lo}$) and the smallest CPG point above the input firing fraction ($CPG_{hi}$).

Step 2: Calculate the midpoint (MP) of $CPG_{lo}$, and $CPG_{hi}$.

Step 3: Determine the point of intersection of a line through $CPG_{lo}$, with slope $S_e$ and a line through MP with slope $S_m$. This is the low breakpoint ($BP_{lo}$).

Step 4: Determine the point of intersection of a line through $CPG_{hi}$ with slope $S_e$ and a line through MP with slope $S_m$. This is the high breakpoint ($BP_{hi}$).

Step 5: Determine in which segment the requested firing fraction lies. The three segments are: a) between $CPG_{lo}$, and $BP_{lo}$; b) between $BP_{lo}$ and $BP_{hi}$; and c) between $BP_{hi}$ and $CPG_{hi}$.

Step 6: Use the corresponding line (represented as a linear equation) to calculate the output firing fraction.

In an implementation that calculates the line segments on the fly, steps 1-5 only need to be calculated when the firing fraction moves from one segment to another, or when one of the input parameters changes (e.g., the set of available CPG points). Thus, only the last step would need to be calculated each firing opportunity. Of course, the results of the first five steps can also readily be implemented in the form of a lookup table to even further simplify the calculations. It should be appreciated that the shape of the line segment(s) between CPG points can readily be customized using such an approach and that the segments can readily be defined using one or more intermediate points other that the midpoint between adjacent CPG points.

This described warping of the firing fraction is compact and easy to calculate. It has the benefit of reducing the probability of acoustic resonance buildup which is more likely to occur when a single firing fraction is used for an extended period of time. The nature of the input firing fraction to output firing fraction map causes the engine to preferentially operate in low vibration regions. The tradeoff between these two objectives (i.e., the preference for dwelling on a vibrationally good point versus the desire to avoid acoustic resonances) can be made using a small set of parameters.

Although the described piecewise linear mapping works well, it should be appreciated that a wide variety of other mappings could readily be used in its place. For example, techniques that use cubic polynomials to match the slope and values at the CPG and midpoint can readily be used and tend to work well. Furthermore, in the illustrated embodiment, a single function is used to define the transitions mapping between CPG points. However, this is not a requirement. In alternative embodiments, different functions can be used to map transitions between adjacent CPG point pairs and/or different slopes may be used for different individual segments. For example, the slope around the CPG point ½ could be zero, whereas adjacent segments may have a positive slope. This may be desirable to permit the engine to operate in a manner more similar to conventional variable displacement engines when the firing fraction is near one half (or other firing fractions that are coextensive with traditional variable displacement operating states). Alternatively, the slope thru the CPG point ½ could be very large or infinite, effectively excluding its operation at that CPG level.

Other Features

The described firing fraction management techniques take advantage of knowledge of engine operational characteristics to encourage the use of firing fractions having lower vibration characteristics while compensating for changes in the firing fraction by altering suitable engine operating parameters (such as the mass air charge). The resulting controllers are generally relatively easy to implement and can significantly reduce NVH issues when compared to conventional skip fire engine control. Although only a few embodiments of the invention have been described in detail, it should be appreciated that the invention may be implemented in many other forms without departing from the spirit or scope of the invention.

Notably, a number of features such as the filters 270 and 274, the inserter 272, the pre-filter 261, the use of hysteresis on various input signal used in calculations within a firing fraction calculator (or other component), the use of a clock based on engine speed or crank angle, etc, have been described in the context of specific embodiments. Although these features have been specifically discussed in the context of certain embodiments, it should be appreciated that the concepts are more general in nature and that such components and their associate functions may be incorporated advantageously in any of the described and/or claimed skip fire firing control units.

Allowing the controller to utilize a fairly wide range of firing fractions as opposed to the fairly small sets contemplated by most skip fire controllers (or the extremely limited selection of displacements allowed in conventional variable displacement engines) facilitates the attainment of better fuel efficiency than is possible in such conventional designs. The active firing fraction management and various described techniques help mitigate NVH concerns. At the same time, the requested torque is delivered by adjusting appropriate engine settings such as the throttle setting, (which helps control manifold pressure and thus the MAC) appropriately to deliver the desired engine output. The resulting combinations facilitate the design of a variety of different economical skip fire engine controllers.

Figure 9:
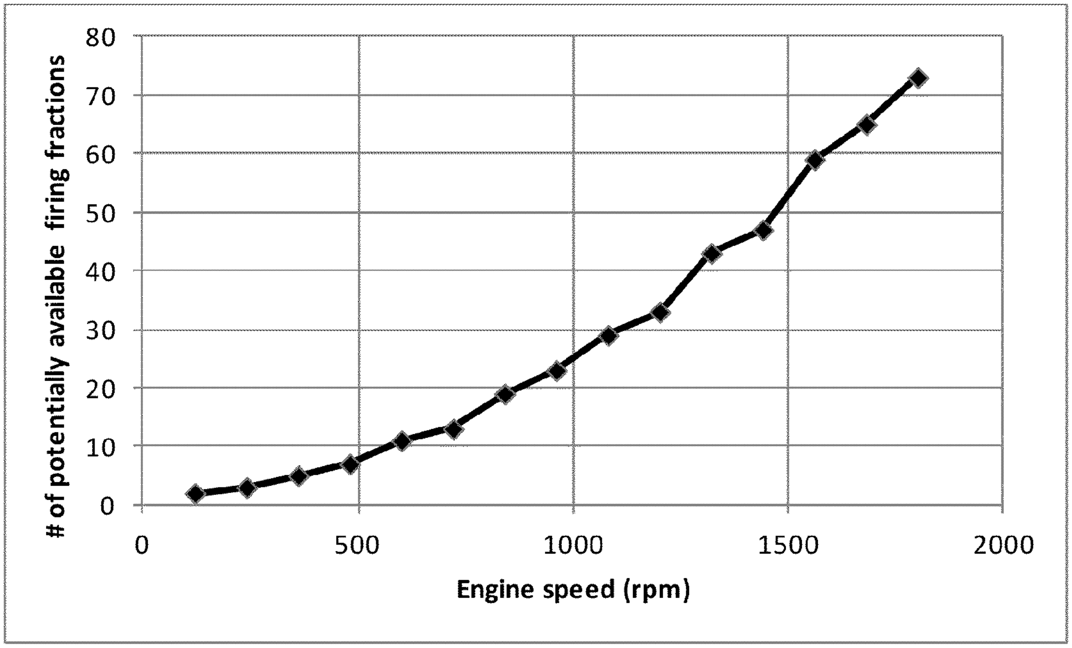
FIG. 9 is a graph of the number of potentially available firing fractions as a function of the engine speed.

It was noted above that in many implementations, the number of available firing fractions may vary as a function of engine speed. Although there are no fixed cutoffs, it is common for the number of available firing fraction states for an eight cylinder engine operating at an engine speed of 1000 RPM or higher to have at least 23 available firing fractions and for the same engine operating of an engine speed of higher than 1500 RPM to have more than double the number of available firing fraction states. By way of example, FIG. 8 graphically illustrates the increase in the number of potentially available firing fractions with increasing MPCFO in the embodiment of FIG. 2. For a fixed cut off frequency the MPCFO scales linearly with engine speed. FIG. 9 plots the increase in potentially available firing fractions for an 8-cylinder, 4-stroke engine having a fixed 8 Hz cut off frequency. As can be seen therein, the number of potentially available firing fractions increases more than linearly with engine speed which facilitates better fuel efficiency and smoother transitions between firing fractions.

Several of the embodiments described discuss algorithmic or logic based approaches to determining an adjusted firing fraction. It should be appreciated that any of the described functionality can readily be accomplished algorithmically, using look-up tables, in discrete logic, in programmable logic or in any other suitable manner.

Although skip fire management is described, it should be appreciated that in actual implementations, skip fire control does not need to be used to the exclusion of other types of engine control. For example, there will often be operational conditions where it is desirable to operate the engine in a conventional (fire all cylinders) mode where the output of the engine is modulated primarily by the throttle position as opposed to the firing fraction. Additionally, or alternatively, when a commanded firing fraction is coextensive with an operational state that would be available in a standard variable displacement mode (i.e., where only a fixed set of cylinders are fired all of the time), it may be desirable to operate only a specific pre-designated sets of cylinders to mimic conventional variable displacement engine operation at such firing fractions.

The invention has been described primarily in the context of controlling the firing of 4-stroke piston engines suitable for use in motor vehicles. However, it should be appreciated that the described continuously variable displacement approaches are very well suited for use in a wide variety of internal combustion engines. These include engines for virtually any type of vehicle—including cars, trucks, boats, aircraft, motorcycles, scooters, etc.; for non-vehicular applications such as generators, lawn mowers, leaf blowers, models, etc.; and virtually any other application that utilizes an internal combustion engine. The various described approaches work with engines that operate under a wide variety of different thermodynamic cycles—including virtually any type of two stroke piston engines, diesel engines, Otto cycle engines, Dual cycle engines, Miller cycle engines, Atkins cycle engines, Wankel engines and other types of rotary engines, mixed cycle engines (such as dual Otto and diesel engines), hybrid engines, radial engines, etc. It is also believed that the described approaches will work well with newly developed internal combustion engines regardless of whether they operate utilizing currently known, or later developed thermodynamic cycles.

Some of the examples in the incorporated patents and patent applications contemplate an optimized skip fire approach in which the fired working chambers are fired under substantially optimal conditions (thermodynamic or otherwise). For example, the mass air charge introduced to the working chambers for each of the cylinder firings may be set at the mass air charge that provides substantially the highest thermodynamic efficiency at the current operating state of the engine (e.g., engine speed, environmental conditions, etc.). The described control approach works very well when used in conjunction with this type of optimized skip fire engine operation. However, that is by no means a requirement. Rather, the described control approach works very well regardless of the conditions that the working chambers are fired under.

As explained in some of the referenced patents and patent applications, the described firing control unit may be implemented within an engine control unit, as a separate firing control co-processor or in any other suitable manner. In many applications it will be desirable to provide skip fire control as an additional operational mode to conventional (i.e., all cylinder firing) engine operation. This allows the engine to be operated in a conventional mode when conditions are not well suited for skip fire operation. For example, conventional operation may be preferable in certain engine states such as engine startup, low engine speeds, etc.

In some of the embodiments, it is assumed that all of the cylinders would be available for use when managing the firing fraction. However, that is not a requirement. If desired for a particular application, the firing control unit can readily be designed to always skip some designated cylinder(s) when the required displacement is below some designated threshold. In still other implementations, any of the described working cycle skipping approaches could be applied to traditional variable displacement engines while operating in a mode in which some of their cylinders have been shut down.

The described skip fire control can readily be used with a variety of other fuel economy and/or performance enhancement techniques—including lean burning techniques, fuel injection profiling techniques, turbocharging, supercharging, etc. Most of the firing controller embodiments described above utilize sigma delta conversion. Although it is believed that sigma delta converters are very well suited for use in this application, it should be appreciated that the converters may employ a wide variety of modulation schemes. For example, pulse width modulation, pulse height modulation, CDMA oriented modulation or other modulation schemes may be used to deliver the commanded firing fraction. Some of the described embodiments utilize first order converters. However, in other embodiments higher order converters may be used.

Most conventional variable displacement piston engines are arranged to deactivate unused cylinders by keeping the valves closed throughout the entire working cycle in an attempt to minimize the negative effects of pumping air through unused cylinders. The described embodiments work well in engines that have the ability to deactivate or shutting down skipped cylinders in a similar manner. Although this approach works well, the piston still reciprocates within the cylinder. The reciprocation of the piston within the cylinder introduces frictional losses and in practice some of the compressed gases within the cylinder will typically escape past the piston ring, thereby introducing some pumping losses as well. Frictional losses due to piston reciprocation are relatively high in piston engines and therefore, significant further improvements in overall fuel efficiency can theoretically be had by disengaging the pistons during skipped working cycles. Over the years, there have been several engine designs that have attempted to reduce frictional losses in variable displacement engines by disengaging the piston from reciprocating. The present inventors are unaware of any such designs that have achieved commercial success. However, it is suspected that the limited market for such engines has hindered their development in production engines. Since the fuel efficiency gains associated with piston disengagement that are potentially available to engines that incorporate the described skip fire and variable displacement control approaches are quite significant, it may well make the development of piston disengagement engines commercially viable.

In view of the foregoing, it should be apparent that the present embodiments should be considered illustrative and not restrictive and the invention is not to be limited to the details given herein, but may be modified within the scope of the appended claims.

What is claimed is:

1. A skip fire engine controller comprising:

a firing fraction determining unit arranged to determine an operational firing fraction and associated engine settings for delivering a desired engine output, wherein the firing fraction determining unit is arranged to select the firing fraction from a set of available firing fractions, wherein the set of available firing fractions varies as a function of engine speed such that more firing fractions are available at higher engine speeds than at lower engine speeds; and a firing controller arranged to direct firings in a skip fire manner that delivers the selected operational firing fraction.

2. A skip fire engine controller as recited claim 1 wherein the firing controller includes an accumulator that tracks a relative portion of a firing that has been requested but not yet directed by the firing controller, whereby the accumulator helps smooth transitions between different firing fractions.

3. A skip fire engine controller as recited in claim 1 wherein the firing controller is arranged to spread the firings while delivering the selected firing fraction and through changes in the selected firing fraction.

4. A skip fire engine controller as recited in claim 1 wherein the firing controller includes or functions substantially equivalently to a first order sigma delta converter.

5. A skip fire engine controller as recited in claim 1 wherein hysteresis is applied by the firing fraction determining unit in the determination of the firing fraction to help reduce the probability of rapid fluctuations back and forth between operational firing fractions.

6. A skip fire engine controller as recited in claim 1 wherein the skip fire engine controller is further arranged to cause the adjustment of at least one selected engine control parameter such that the engine outputs the desired output at the operational firing fraction.

7. A skip fire engine controller as recited in claim 1 further comprising an inserter arranged to occasionally instruct the firing controller to insert additional firings to help facilitate breaking a cyclic pattern associated with the selected operational firing fraction.

8. A skip fire engine controller as recited in claim 1 further comprising a dither inserter arranged to add dither to the selected firing fraction to help facilitate breaking a cyclic pattern associated with the selected operational firing fraction.

9. A skip fire engine controller as recited in claim 1 wherein the firing fraction determining unit outputs a commanded firing fraction signal indicative of the selected operational firing fraction to the firing controller, the skip fire engine controller further comprising a filter arranged to spread commanded firing fraction changes over multiple firing opportunities.

10. A skip fire engine controller as recited in claim 1 wherein the firing fraction determining unit includes a lookup table that identifies firing fractions that are suitable for use as the selected firing fraction and wherein an index for the lookup table is at least one selected from the group consisting of requested output, requested firing fraction and engine speed.

11. A skip fire engine controller as recited in claim 10 wherein the lookup table is a multi-dimensional lookup table and a first index to the lookup table is one of requested output and requested firing fraction and a second index for the lookup table is engine speed.

12. A skip fire engine controller as recited in claim 10 wherein an additional index to the lookup table is transmission gear.

13. A skip fire engine controller as recited in claim 1 wherein the firing fraction determining unit is arranged to select an operational firing fraction that reduces vibrations in a frequency range that substantially matches a frequency range in which occupants of a vehicle are most sensitive to.

14. A skip fire engine controller as recited in claim 1 wherein the firing fraction determining unit is further arranged to prevent the use of operational firing fractions that would generate undesirable acoustic noise.

15. An engine including a skip fire engine controller as recited in claim 1.

16. A skip fire engine controller comprising:

a firing fraction determining unit arranged to determine a commanded operational firing fraction;

a firing controller arranged to direct firings in a skip fire manner that delivers the operational firing fraction, wherein the firing controller is arranged to track a portion of a firing that has been requested but not yet directed by the firing controller to thereby help manage transitions between different commanded firing fractions; and a filter arranged to spread commanded firing fraction changes over multiple firing opportunities.

17. A skip fire engine controller as recited in claim 16 wherein the filter is a low pass filter.

18. A skip fire engine controller as recited in claim 16 further comprising a filter bypass that allows the filter to be bypassed in response to at least one predetermined type of change in commanded operational firing fraction.

19. A skip fire engine controller as recited in claim 16 wherein the filter is selected from the group consisting of an infinite impulse response (RR) filter and a finite impulse response (FIR) filter.

20. A skip fire engine controller as recited in claim 16 wherein a clock used for the filter is a variable clock based on engine speed.

21. A skip fire engine controller as recited in claim 16 wherein the filter has a response that substantially matches variations in manifold absolute pressure.

22. A skip fire engine controller as recited in claim 16 further comprising:

an engine parameter adjusting block arranged to cause the adjustment of at least one selected engine control parameter sufficiently such that the engine outputs a desired output at the commanded operational firing fraction, and a second filter having a filter response arranged to substantially match a response of the at least one selected engine control parameter, the second filter being arranged to cause changes in the commanded firing fraction to correspond to changes in the at least one selected engine control parameter.

23. A skip fire engine controller as recited in claim 16 wherein the firing controller is arranged to spread the firings while delivering the selected firing fraction and through changes in the selected firing fraction.

24. A skip fire engine controller as recited in claim 16 wherein the firing controller includes an accumulator that tracks a relative portion of a firing that has been requested but not yet directed by the firing controller, whereby the accumulator helps smooth transitions between different firing fractions.

25. A skip fire engine controller as recited in claim 16 wherein the firing controller includes or functions substantially equivalently to a first order sigma delta converter.

26. A skip fire engine controller as recited in claim 16 wherein hysteresis is applied by the firing fraction determining unit in the determination of the firing fraction to help reduce the probability of rapid fluctuations back and forth between operational firing fractions.

27. An engine including a skip fire engine controller as recited in claim 15.

28. A skip fire engine controller comprising:

a firing fraction determining unit arranged to receive an input signal indicative of a desired engine output and to output a commanded firing fraction arranged to deliver the desired engine output;

a firing controller arranged to direct firings in a skip fire manner that delivers the determined firing fraction, wherein the firing controller is arranged to track a portion of a firing that has been requested but not yet directed by the firing controller to thereby help manage transitions between different commanded firing fractions;

a power train parameter adjusting block arranged to cause the adjustment of at least one selected power train control parameter sufficiently such that the engine outputs the desired output at the commanded firing fraction, and a filter having a filter response arranged to substantially match a response of the at least one selected power train control parameter, the filter being arranged to cause changes in the commanded firing fraction to correspond to changes in the at least one selected power train control parameter.

29. A method of determining a firing fraction for use by a skip fire engine controller arrange to direct engine working chamber firings in a skip fire manner to deliver a desired engine output:

providing a multiplicity of available firing fractions that are suitable for use under selected operational conditions wherein the number of available firing fractions vary as a function of engine speed; and selecting an operational firing fraction based at least in part upon the desired engine output and a current engine speed.

30. A method as recited in claim 29 wherein the selection of the operational firing fraction is also based at least in part on a current operational transmission gear.

31. A method as recited in claim 29 wherein a sigma delta converter is used to indicate specific working chamber firings that are appropriate to deliver the determined firing fraction.

32. A method as recited in claim 29 wherein changes in the operational firing fraction are spread over multiple firing opportunities.

33. A method as recited in claim 29 further comprising occasionally directing additional individual firings in addition to the determined operational firing fraction to facilitate breaking a cyclic pattern associated with the repeating firing cycle length.

34. A method as recited in claim 29 further comprising adding dither to the commanded operational firing fraction to facilitate breaking a cyclic pattern associated with the repeating firing cycle length.

35. A method as recited in claim 29 wherein the firing fraction is determined based at least in part by referencing a lookup table that identifies firing fractions that are suitable for use as the determined firing fraction and wherein an index for the lookup table is at least one of requested output, requested firing fraction and engine speed.

36. A method as recited in claim 35 wherein the lookup table is a multi-dimensional lookup table and a first index to the lookup table is one of requested output and requested firing fraction and a second index for the lookup table is engine speed.

37. A method as recited in claim 29 wherein firing fractions which generate acoustic resonances within an associated vehicle cabin or exhaust system are excluded.

* * * * *

UNITED STATES PATENT AND TRADEMARK OFFICE

CERTIFICATE OF CORRECTION

PATENT NO. : 9,086,020 B2
APPLICATION NO. : 13/654244
DATED : July 21, 2015
INVENTOR(S) : Pirjaberi et al.

It is certified that error appears in the above-identified patent and that said Letters Patent is hereby corrected as shown below:

CLAIMS:

Column 26, Claim 19, Line 41, change “RR” to --IIR--.

Column 27, Claim 27, Line 13, change “Claim 15” to --Claim 16--.

Signed and Sealed this
Twelfth Day of January, 2016

Michelle K. Lee

Michelle K. Lee
*Director of the United States Patent and Trademark Office*